United States Patent
Wuest et al.

(10) Patent No.: US 11,135,680 B2
(45) Date of Patent: Oct. 5, 2021

(54) IRRADIATION DEVICES, MACHINES, AND METHODS FOR PRODUCING THREE-DIMENSIONAL COMPONENTS

(71) Applicant: TRUMPF Laser—und Systemtechnik GmbH, Ditzingen (DE)

(72) Inventors: Frank Peter Wuest, Herrenberg (DE); Thomas Koenig, Tiefenbronn-Muehlhausen (DE); Damien Buchbinder, Gerlingen (DE); Joachim Wagner, Stuttgart (DE); Johannes Bauer, Illingen (DE)

(73) Assignee: TRUMPF Laser- und Systemtechnik GmbH, Ditzingen (DE)

( * ) Notice: Subject to any disclaimer, the term of this patent is extended or adjusted under 35 U.S.C. 154(b) by 301 days.

(21) Appl. No.: 16/100,572

(22) Filed: Aug. 10, 2018

(65) Prior Publication Data
US 2018/0345413 A1 Dec. 6, 2018

Related U.S. Application Data

(63) Continuation of application No. PCT/EP2017/052636, filed on Feb. 7, 2017.

(30) Foreign Application Priority Data

Feb. 10, 2016 (WO) .................. PCT/EP2016/052772

(51) Int. Cl.
*B23K 26/342* (2014.01)
*B23K 26/073* (2006.01)
(Continued)

(52) U.S. Cl.
CPC ............ *B23K 26/342* (2015.10); *B22F 12/00* (2021.01); *B23K 26/073* (2013.01);
(Continued)

(58) Field of Classification Search
CPC .. B23K 26/342; B23K 26/082; B23K 26/073; B23K 26/0736; B33Y 30/00;
(Continued)

(56) References Cited

U.S. PATENT DOCUMENTS 4,863,538 A 9/1989 Deckard
5,155,324 A 10/1992 Deckard et al.
(Continued)

FOREIGN PATENT DOCUMENTS

CN 101331592 A 12/2008
CN 104190931 A 12/2014
(Continued)

OTHER PUBLICATIONS

CN Office Action in Chinese Appln. No. 201780022630, dated Mar. 30, 2020, 18 pages (with English translation).
(Continued)

*Primary Examiner* — Jimmy Chou
(74) *Attorney, Agent, or Firm* — Fish & Richardson P.C.

(57) ABSTRACT

Methods and computer-readable media for producing at least one portion of a layer of a three-dimensional component by irradiating at least one powder layer by at least one high-energy beam, e.g., a laser beam are disclosed. The methods include irradiating the powder layer by the at least one high-energy beam in a processing field, wherein the at least one high-energy beam is moved in a continuous oscillating movement over the powder layer in a first direction to produce a line-shaped irradiation region in which the powder layer is melted, and wherein the line-shaped irradiation region is moved over the powder layer in a second direction that differs from the first to produce the portion of the layer of the three-dimensional component.

18 Claims, 7 Drawing Sheets

(51) Int. Cl.
    *B23K 26/082*     (2014.01)
    *B33Y 30/00*     (2015.01)
    *B29C 64/153*     (2017.01)
    *B33Y 50/00*     (2015.01)
    *B29C 64/268*     (2017.01)
    *B22F 12/00*     (2021.01)
    *B22F 10/10*     (2021.01)

(52) U.S. Cl.
    CPC ........ *B23K 26/0736* (2013.01); *B23K 26/082* (2015.10); *B29C 64/153* (2017.08); *B29C 64/268* (2017.08); *B33Y 30/00* (2014.12); *B33Y 50/00* (2014.12); *B22F 10/10* (2021.01); *Y02P 10/25* (2015.11)

(58) Field of Classification Search
    CPC ....... B33Y 50/00; B33Y 10/00; B29C 64/153; B29C 64/268; B22F 3/1055; B22F 2003/1056; Y02P 10/25
    USPC .................................................. 219/121.64
    See application file for complete search history.

(56) References Cited

U.S. PATENT DOCUMENTS

| | | | | |
|---|---|---|---|---|
| 5,753,171 | A * | 5/1998 | Serbin | B33Y 30/00 264/401 |
| 5,904,890 | A * | 5/1999 | Lohner | B22F 10/30 264/401 |
| 6,132,667 | A * | 10/2000 | Beers | G03F 7/0037 264/401 |
| 6,426,840 | B1 | 7/2002 | Partanen et al. | |
| 7,452,500 | B2 | 11/2008 | Uckelmann | |
| 9,527,246 | B2 | 12/2016 | Wiesner et al. | |
| 9,687,911 | B2 * | 6/2017 | Abe | B33Y 10/00 |
| 9,789,563 | B2 * | 10/2017 | Elfstroem | B22F 10/20 |
| 9,962,767 | B2 * | 5/2018 | Buller | B23K 26/04 |
| 10,661,341 | B2 * | 5/2020 | Romano | B22F 12/00 |
| 10,688,561 | B2 * | 6/2020 | Diaz | B28B 1/001 |
| 10,695,867 | B2 * | 6/2020 | Etter | B22F 12/00 |
| 2003/0044647 | A1 | 3/2003 | Kavosh et al. | |
| 2004/0112280 | A1 | 6/2004 | Beck et al. | |
| 2005/0186538 | A1 * | 8/2005 | Uckelmann | B22F 10/20 433/201.1 |
| 2006/0157454 | A1 * | 7/2006 | Larsson | B33Y 10/00 219/121.8 |
| 2006/0192322 | A1 | 8/2006 | Abe et al. | |
| 2007/0108170 | A1 * | 5/2007 | Costin, Sr. | B23K 26/082 219/121.85 |
| 2009/0206065 | A1 * | 8/2009 | Kruth | B23K 26/0665 219/121.66 |
| 2011/0259862 | A1 | 10/2011 | Scott et al. | |
| 2012/0132627 | A1 * | 5/2012 | Wescott | B23K 26/342 219/121.66 |
| 2012/0267345 | A1 | 10/2012 | Clark et al. | |
| 2013/0216836 | A1 * | 8/2013 | Grebe | B32B 5/16 428/411.1 |
| 2014/0072438 | A1 * | 3/2014 | Bruck | B23K 26/082 416/223 R |
| 2014/0154088 | A1 * | 6/2014 | Etter | B22F 10/20 416/223 R |
| 2015/0135897 | A1 * | 5/2015 | Sutcliffe | B23K 15/10 75/249 |
| 2015/0165545 | A1 * | 6/2015 | Goehler | C30B 13/24 219/121.15 |
| 2015/0198052 | A1 * | 7/2015 | Pavlov | F23R 3/002 416/241 B |
| 2015/0202687 | A1 * | 7/2015 | Pialot | B23K 26/342 419/55 |
| 2016/0067820 | A1 * | 3/2016 | Mironets | B22F 12/00 419/7 |
| 2016/0114432 | A1 * | 4/2016 | Ferrar | B22F 12/00 219/76.12 |
| 2016/0158841 | A1 * | 6/2016 | Holcomb | H05B 6/101 219/603 |
| 2016/0271884 | A1 * | 9/2016 | Herzog | B23K 15/02 |
| 2016/0279706 | A1 * | 9/2016 | Domrose | B33Y 10/00 |
| 2017/0014950 | A1 * | 1/2017 | Okada | B33Y 50/02 |
| 2017/0106444 | A1 * | 4/2017 | Ishida | B22F 10/10 |
| 2017/0157704 | A1 * | 6/2017 | Ladewig | B23K 26/342 |
| 2017/0165751 | A1 * | 6/2017 | Buller | B23K 26/1462 |
| 2017/0190905 | A1 * | 7/2017 | Arai | B29C 64/393 |
| 2017/0197278 | A1 * | 7/2017 | Garry | B23K 26/034 |
| 2017/0282296 | A1 * | 10/2017 | Kitani | B22F 10/20 |
| 2017/0326806 | A1 * | 11/2017 | Reynolds | B29C 64/205 |
| 2018/0154443 | A1 * | 6/2018 | Milshtein | B23K 26/342 |
| 2018/0186082 | A1 * | 7/2018 | Randhawa | B23K 26/125 |
| 2018/0193923 | A1 * | 7/2018 | Koch | B23K 26/123 |
| 2018/0250744 | A1 * | 9/2018 | Symeonidis | B23K 26/034 |
| 2018/0272611 | A1 * | 9/2018 | Cantzler | B29C 64/245 |
| 2019/0111617 | A1 * | 4/2019 | Arai | B33Y 30/00 |
| 2019/0232427 | A1 * | 8/2019 | Roychowdhury | B23K 26/0626 |
| 2019/0265100 | A1 * | 8/2019 | Wagenblast | G02B 5/126 |
| 2019/0270139 | A1 * | 9/2019 | Wuest | B22F 10/20 |
| 2019/0270161 | A1 * | 9/2019 | Allenberg-Rabe | G02B 26/101 |
| 2019/0291348 | A1 * | 9/2019 | Khairallah | B29C 64/153 |

FOREIGN PATENT DOCUMENTS

| | | |
|---|---|---|
| DE | 199 53 000 | 5/2001 |
| DE | 10 2011 105 045 | 6/2012 |
| DE | 10 2012 011 418 | 12/2013 |
| DE | 11 2013 003 063 | 3/2015 |
| EP | 1 568 472 | 8/2005 |
| EP | 2 596 901 | 5/2013 |
| JP | S63 224889 | 9/1988 |
| JP | H02 142690 | 5/1990 |
| JP | 2002144061 | 5/2002 |
| JP | 2002144061 A * | 5/2002 |
| WO | WO 2012/102655 | 8/2012 |

OTHER PUBLICATIONS

International Preliminary Report on Patentability in International Application No. PCT/EP2017/052636, dated Aug. 23, 2018, 10 pages (English translation).

International Search Report and Written Opinion in International Application No. PCT/EP2017/052636, dated May 30, 2017, 22 pages (with English translation).

International Search Report and Written Opinion in International Application No. PCT/EP2016/052772, dated Jul. 28, 2016, 30 pages (with English translation).

\* cited by examiner

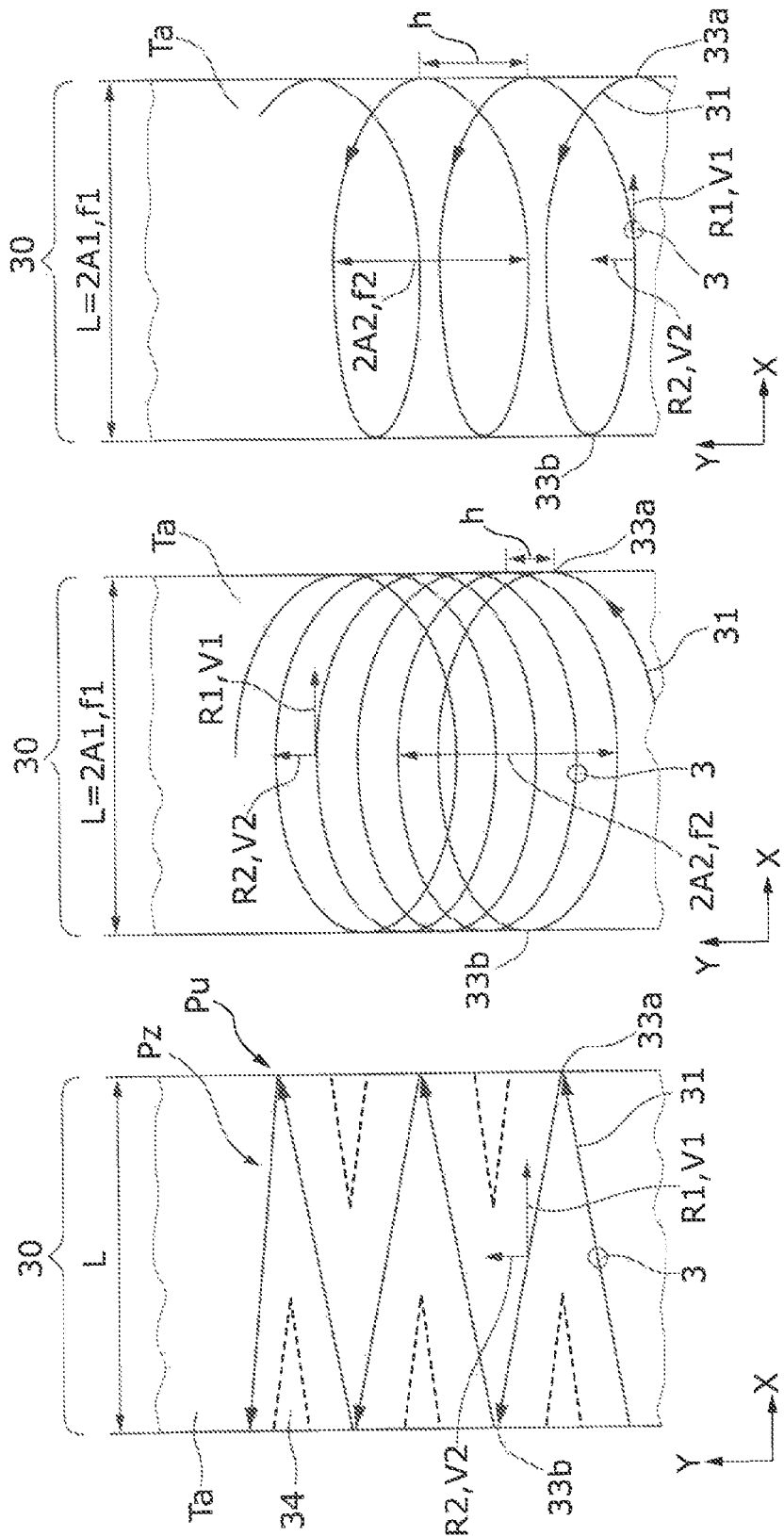

IRRADIATION DEVICES, MACHINES, AND METHODS FOR PRODUCING THREE-DIMENSIONAL COMPONENTS

CROSS-REFERENCE TO RELATED APPLICATIONS

This application is a continuation of and claims priority under 35 U.S.C. § 120 from PCT Application No. PCT/EP2017/052636, filed on Feb. 7, 2017, which claims priority to PCT Application No. PCT/EP2016/052772, filed on Feb. 10, 2016, the entire contents of which are incorporated herein by reference in their entireties.

TECHNICAL FIELD

The present invention relates to irradiation devices for processing machines for producing three-dimensional components by irradiating powder layers with a high-energy beam, in particular a laser beam. The invention also relates to processing machines having such irradiation devices, and methods for producing a layer, or at least a portion of a layer, of a three-dimensional component by irradiating a powder layer with a high-energy beam, in particular a laser beam.

BACKGROUND

Three-dimensional components can be produced by so-called additive manufacturing methods. In such methods, the three-dimensional component is generated layer-by-layer. In so-called selective laser melting (SLM) and in so-called selective laser sintering (SLS), a powder material is locally melted by a high-energy beam, in particular a laser beam, to produce a layer of a three-dimensional component.

EP 2 596 901 A1 describes a procedure referred to as skin-core strategy, in which the component to be generated is virtually split into a skin region and a core region. When generating the component, the skin region is initially irradiated by a high-energy beam having a comparatively narrow and/or Gaussian beam profile, while the core region is subsequently irradiated by a high-energy beam having a comparatively broad and/or homogeneous beam profile, and so the core region can be melted faster than the skin region. At least two different beam profiles are required for realizing the skin-core strategy.

EP 2 596 901 A1 discloses an optical irradiation apparatus for an installation for producing three-dimensional workpieces, which is embodied to produce a first beam profile and a second beam profile that differs from the first to realize the skin-core strategy when producing a three-dimensional component. The optical irradiation device has a switchover apparatus, which guides the entering light beam in a first light guiding state without a change in the beam profile to an output connector and which guides the entering light beam in a second light guiding state to the output connector by means of a multimode optical fiber to produce the second beam profile that differs from the first. Typically, the first beam profile is a Gaussian beam profile.

DE 199 53 000 A1 discloses an apparatus for layer-by-layer construction of bodies, in which a plurality of beams are used for producing the bodies quickly. The quick production of the body is achieved, as in EP 2 596 901 A1, by virtue of a first radiation source being used to produce contours and a second radiation source being used for quick realization of the interior of the body to be produced when sintering or welding a powdery substance. The first radiation source produces a small focus for producing the contours. The second radiation source welds or sinters a plurality of layers between the produced contours. To this end, the second radiation source may have a one-dimensional scanner for producing a line focus, which is moved over the body to be produced by means of an XY-positioning unit. In another embodiment, the radiation source is embodied to produce an area-wise irradiation, wherein a mask that may be modifiable in terms of its contour to adapt the form of the irradiated area is arranged between the second radiation source and the body.

DE 11 2013 003 063 T5 discloses a method for producing a three-dimensional formed object in which a solidified layer is produced by irradiating a predetermined section of a powder layer with a light beam. In one example, an initial path is a path along a contour and subsequent paths are situated within the contour, wherein each of the subsequent paths adjoins a path preceding the latter to melt together the material within the powder layer.

Adjoining or slightly laterally overlapping paths within the contour are typically irradiated by the light beam in the opposite direction in DE 11 2013 003 063 T5. A problem occurring here is that the irradiated powder material at the end of a path is hotter than the powder material at the start of a subsequent, adjoining path, which is scanned in the opposite direction.

According to U.S. Pat. No. 4,863,538, a further problem is the fact that, in a method for selective laser sintering in which a so-called raster scan is used for producing a component, arcs or lines that do not extend parallel to the two axes of the raster can only be approximated by the edges of the illuminated area and consequently do not correspond to the intended edges. This may reduce resolution when producing a component if the laser beam does not scan the edge of the layer of the component to be produced or the edge of the illuminated area in the so-called vector mode in an additional step.

WO 2012/102655 A1 proposes to optimize the specific energy influx along an irradiation path for melting a powder layer by virtue of, for example, changing the velocity of the beam, the power of the beam or a beam diameter along the irradiation path. For optimization purposes, a temperature in the powder layer along the irradiation path is calculated, inter alia; i.e., there is complex modeling of the heat influx and of the heat dissipation along the irradiation path.

EP 1 568 472 A1 describes a method for producing products that are constructed layer-by-layer from a material by means of a high-energy beam. Here, the beam irradiates predetermined positions of a material layer m times (m>1) in each case, with it holding true for each of these positions that they are initially heated to a temperature below the melting temperature of the material during the first irradiation and heated to an m-th temperature above this melting temperature during the m-th irradiation and, in the process, they are melted over the entire layer thickness in such a way that the material at this position connects to the layer lying below this position. However, the problem of an uneven temperature distribution setting-in in the material of the powder layer also exists in the method described in EP 1 568 472 A1.

SUMMARY

The invention is based on the object of specifying irradiation devices, processing machines having such an irradiation device, and associated methods, by means of which a particularly efficient production of three-dimensional components is possible.

According to a first aspect, this object is achieved by an irradiation device of the type set forth at the outset, including a beam-forming device for forming a beam profile of the high-energy beam that has a length along a first direction perpendicular to the beam axis of the high-energy beam and that has a width along a second direction perpendicular to the beam axis of the high-energy beam, the width being shorter than the length, and a scanner device for aligning the high-energy beam to an (adjustable) position in a processing field of the scanner device for irradiating a powder layer by the high-energy beam, wherein the irradiation device is embodied to change the length and/or the width of the beam profile of the high-energy beam (in particular continuously) depending on the position of the high-energy beam in the processing field.

According to the invention, the use of an irradiation device whose beam-forming device renders it possible to change the dimensions of the beam profile of the high-energy beam in at least the first direction (i.e., in the length) and optionally, additionally, in the second direction is proposed for producing a three-dimensional component. The first direction (length) of the beam profile and the second direction (width) of the beam profile extend perpendicular to one another and perpendicular to the beam axis or the direction of propagation of the high-energy beam.

The beam-forming device can be embodied to change only the length of the beam profile. The beam-forming device can also be embodied to change also the width of the beam profile in addition to the length. If the beam-forming device is embodied to change both the length and the width of the beam profile, the two dimensions (length and width) typically can be changed (substantially) independently of one another (in particular, continuously). The beam-forming device can be embodied to produce a line-shaped beam profile, i.e., a beam profile whose length is significantly greater than its width. By way of example, the length L may be more than twenty times greater, more than ten times greater, or more than five times greater than the width B (L>20×B, L>10×B or L>5×B) in such a line-shaped beam profile.

The scanner device is typically arranged after the beam-forming device in the beam path of the high-energy beam and serves to align the high-energy beam onto an (adjustable) position in a processing field of the scanner device. Below, the processing field is understood to be a two-dimensional region (also referred to as the scan region), in which the high-energy beam is focused by means of a focusing device. The high-energy beam can be aligned onto any position within the processing field by means of the scanner device. The focusing device for focusing the high-energy beam into the processing field can be arranged before or after the scanner device. In particular, the processing field can extend in a plane in which a powder layer that should be irradiated by means of the high-energy beam is arranged. Ideally, the processing field forms a plane area in which the powder layer to be irradiated is arranged. If need be, the processing field can deviate slightly from a plane geometry, particularly at its lateral edges.

In conventional irradiation devices, the processing field or—if the skin-core method is applied—one or more portions of the processing field is/are scanned in a meandering manner along a plurality of lines with the aid of a scanner device, a direction reversal during the scanning process occurring in each case at the ends of said lines. The direction reversal produces a delay and a renewed acceleration of movable components provided in the scanner device, for example in the form of scanner mirrors, leading to time losses during the scan process and constituting a limiting factor for the construction rate when producing three-dimensional components.

As a result of changing the beam profile of the high-energy beam depending on the position of the high-energy beam on the processing field, the focus geometry of the high-energy beam can be adapted on the processing field to the geometry of the three-dimensional component to be produced, without two or more optical imaging systems or lasers being required to this end. By way of example, the length of the beam profile perpendicular to the current scan direction can be adapted on the processing field to the size, for example the width, of an areal portion of the processing field that should be irradiated in each case. In this case, it may be sufficient for the high-energy beam to scan the portion of the processing field to be irradiated only a single time along a predetermined trajectory, wherein the trajectory is predetermined by the scanner device. In particular, the area to be irradiated of the respective powder layer can be divided by a programming system into a plurality of strip-shaped portions depending on the geometry of the component to be produced, wherein the strip width of the strip-shaped portions is typically no greater than the maximum length of the beam profile of the high-energy beam in the processing field.

A respective strip-shaped portion can be scanned a single time along a typically non-meandering trajectory by the high-energy beam with an adapted length (and optionally an adapted width) of the beam profile, and so it is possible to dispense with meandering scanning of the areal portions of the processing field to be irradiated. Consequently, the scanner device still serves to predetermine only the trajectory along which the high-energy beam, which is changeable in terms of its geometry or in terms of its dimensions, is moved over the processing field, with the trajectory typically corresponding to the path of the center of the beam profile of the high-energy beam that is changeable in terms of its geometry. Since no fast direction reversal at the edges of the meandering lines is required anymore according to the present disclosure, a cost effective scanner device can be used for irradiating the component or the powder layer, such a scanner device operating less dynamically than is the case for conventional irradiation devices for producing three-dimensional components.

In one embodiment, the beam-forming device has at least one first adjustable beam telescope for changing the length of the beam profile. By changing the length of the beam profile, it is possible, for example, to change the dimension of the laser beam focus on the processing field in a direction transverse to a (current) scanning direction, along which the laser beam is moved by means of the scanner device, and adapt the geometry to the geometry of a portion of the irradiation field to be irradiated. By way of example, the beam telescope can have two or more cylindrical lens elements.

In a further embodiment, the beam-forming device has at least one, second adjustable beam telescope for changing the width of the beam profile (in particular, independently of setting the length of the beam profile). To this end, the second beam telescope may likewise have two more cylindrical lens elements, the cylinder axes of which are typically aligned perpendicular to the cylinder axes of the cylindrical lens elements of the first beam telescope. The (optionally additional) change in the width of the beam profile may be advantageous, for example, to produce pre-heating and/or post-heating of a respectively irradiated portion of the powder layer if the longitudinal direction of the high-energy beam is aligned transversely to the current scanning direction along the trajectory or scan curve.

In another embodiment, at least one first beam telescope and/or at least one second beam telescope has/have a lens element, preferably a cylindrical lens element, which is displaceable in the direction of the beam axis of the high-energy beam. As a rule, a respective beam telescope typically has at least one cylindrical lens element, e.g., at least two cylindrical lens elements, to be able to set the beam profile in a direction (and, independently of a second direction perpendicular to the first). At least one of the cylindrical lens elements can be embodied to be displaceable in the beam direction of the high-energy beam to change the length or the width of the beam profile. The displacement of the (cylindrical) lens element can be implemented with the aid of an actuator of the beam-forming device depending on the length and/or width of the beam profile to be set. Instead of cylindrical lens elements, it is possible, optionally, to use other optical components, for example reflecting optical elements, in the beam telescope or beam telescopes, wherein the other optical components have the same or similar optical effects.

In a further embodiment, the beam-forming device is embodied to form a beam profile of the high-energy beam, the length of which corresponds to the width thereof. In this case, the beam-forming device is embodied not only to produce an asymmetric beam profile (length>width), but it can also serve to produce a symmetric beam profile with (substantially) identical dimensions in the first and in the second direction. In this case, the dimensions in both directions are typically very small such that an (approximately) punctiform beam profile is produced. By means of a high-energy beam with such an approximately punctiform beam profile, it is possible to track, e.g., contours or contour lines of the three-dimensional component to be produced.

Alternatively, it is possible to remove the beam-forming device, in particular the beam telescope or telescopes, from the beam path of the high-energy beam for tracking the contour lines. In this way, the typically symmetric beam profile, which is produced by a laser source and which may possibly also be present at the output surface of an optical fiber in the case of a suitable design, is maintained when passing through the irradiation device. If the beam-forming device is removed from the beam path of the high-energy beam, it may be necessary to arrange an additional focusing optical unit in the beam path instead of the beam-forming device.

In a further embodiment, the beam-forming device is embodied to change the alignment of the first direction and the second direction of the beam profile in a plane perpendicular to the beam axis of the high-energy beam depending on the position of the high-energy beam in the processing field, in particular to rotate the first and the second direction in a plane perpendicular to the beam axis of the high-energy beam. By rotating the (asymmetric) beam profile in the plane perpendicular to the beam axis of the high-energy beam, it is possible to change the alignment of the (focused) beam profile in the processing field defined by the scanner device. In particular, the (asymmetric) beam profile of the laser beam can be rotated in the processing field, when necessary, to simplify the tracking of certain contours of the component to be produced. If desired, the first and the second direction of the beam profile can also be rotated depending on the current scanning direction on the processing field in such a way, for example, that the longitudinal direction of the beam profile always extends perpendicular to the trajectory of the high-energy beam along the processing field.

By way of example, rotating the beam profile is advantageous if portions of the processing field should be irradiated by means of the high-energy beam, the portions having different orientations in the processing field such that these typically have to be scanned along curves that likewise have different orientations. It is understood that, optionally simultaneously with a rotation of the beam profile, it is also possible to change the length and/or the width of the beam profile to obtain a desired areal irradiation of the processing field or of a respective portion of the processing field.

In an additional embodiment, the at least one first beam telescope and/or the at least one second beam telescope is/are rotatably mounted about the beam axes of the high-energy beam, and the irradiation device has at least one drive for rotating the at least one first and/or second beam telescope about the beam axis. By rotating the respective beam telescope about the beam axis of the high-energy beam, it is possible to change the alignment of the (asymmetric) beam profile in a particularly simple manner.

In a further embodiment, the irradiation device additionally includes a collimation device, arranged in the beam path of the high-energy beam ahead of the at least one first and/or second beam telescope, for collimating the high-energy beam. In particular, the collimation device can have a rotationally symmetric lens element, for example a biconvex lens element or a plano-convex lens element, to collimate the typically divergently incident high-energy beam. By way of example, the high-energy beam may emerge divergently from a fiber end of a fiber in which the high-energy beam is guided, for example in the form of a laser beam. The fiber may have a round or cylindrical cross-section section such that the high-energy beam emerges from the fiber with a round beam cross-section; however, it is also possible for the fiber to have, e.g., a rectangular cross-section such that the high-energy beam emerges from the fiber with a rectangular beam profile. The length and width of the beam profile of the high-energy beam can be changed with the aid of the beam telescope or telescopes; by way of example, an elliptic beam cross-section can be produced from a round beam cross-section after the collimation device, or it is possible to change the aspect ratio (length:width) of the rectangular beam profile.

In a further embodiment, the beam-forming device has at least one further optical element for additional forming, in particular splitting, of the beam profile. By way of example, the further optical element for the additional forming of the beam profile can be a diffractive optical element. By way of example, the diffractive optical element can be embodied in the form of a diffraction grating; however, it is also possible to embody the diffractive optical element as, e.g., a computer-generated hologram or the like. A diffractive optical element renders it possible to produce a beam profile with, in principle, almost any geometry from the beam profile of the high-energy beam incident thereon. By way of example, the diffractive optical element can serve to convert a beam profile with a rectangular geometry into a beam profile with an elliptic geometry, or vice versa.

The further optical element can be an additional optical element of the beam-forming device. In this case, the further optical element may optionally be introduced into the beam path of the high-energy beam or be removed therefrom, depending on whether the optical power of the further optical element is wanted or not during the production of a respective three-dimensional component or one or more layers, or portions of layers, of the three-dimensional component. It is also possible for an optical element, e.g., a lens element, which is arranged in the beam-forming device in any case, to act as a further, e.g., diffractive optical element, for example the collimation lens element described above or an optical element, in particular a lens element, of the first and/or the second beam telescope.

As an alternative or in addition to the use of a diffractive optical element, it is possible to use one or more further optical elements for the additional beam forming, said one or more further optical elements only acting on individual profile regions of the beam profile, for example, to separate, in particular laterally offset, these relative to the residual beam profile. By way of example, one or more profile regions of the beam profile can be spatially separated from other profile regions of the beam profile by means of one or more wedge-shaped optical elements that cover only part of the beam path, and so the beam profile is divided into a plurality of profile regions. In this way, it is possible to produce a beam profile of the high-energy beam that is divided into two or more parts, for example divided into three parts, along, e.g., the second direction, i.e., in its width, i.e., a beam profile that has, e.g., a first profile region, a second profile region, and a third profile region in the second direction, which profile regions are separated by profile regions lying therebetween, in which the beam profile has only a very low power.

Such a division of the beam profile, in the second direction in particular, may serve, for example, to produce pre-heating and/or post-heating of the component to be produced or of the powder layer. In this case, an optionally high fraction, e.g., more than 70%, of the entire power of the high-energy beam can be apportioned to the second, middle profile region. To the extent that the area of the portion of the beam path covered by the further optical element or elements is adjustable, it is also possible in each case to adjust the power of the high-energy beam apportioned to the first, second, and third profile regions to obtain a desired energy influx during the pre-heating and the post-heating.

In a further embodiment, the irradiation device additionally includes a lens, for example an F/theta lens, for focusing the high-energy beam during the alignment on the (respective) position in the processing field of the scanner device. Typically, such a lens is arranged after the movable scanner mirrors, numbering two as a rule, of the scanner device, wherein the scanner mirrors serve to align the high-energy beam onto any position in the processing field. A lens renders it possible to focus the high-energy beam in an (approximately) plane processing field, at which the powder layer to be irradiated in each case is typically arranged. As an alternative or in addition to focusing of the high-energy beam after the scanner device, for example by means of a lens, it is also possible to focus the high-energy beam by means of a focusing device, for example by means of one or more lenses, wherein the focusing device is arranged in the beam path in front of the scanner device. In this case, the scanner device aligns a convergent high-energy beam at a respective position on the processing field instead of a collimated high-energy beam.

In a further embodiment, the irradiation device has a beam source, in particular a laser source, for producing the high-energy beam. By way of example, the beam source can be embodied as a CO2 laser, as an Nd:YAG laser, as a fiber laser, or as a high power diode laser that, ideally, produces a laser beam with a power of more than 50 W, e.g., several kW. By way of example, an optical fiber can serve to guide the laser beam from the beam source to the beam-forming device. In place of a laser source, one can also use other beam sources for producing electromagnetic radiation or a high-energy beam, typically having a power of at least 50 W.

The current power emitted by the beam source likewise can be changed or adapted depending on the position of the high-energy beam in the processing field and consequently depending on the current length and/or width of the beam profile, for example with the aid of a control device that is described in more detail below. Here, the surface power, which depends on the current laser power and the current length and width of the beam profile, can be coupled to the advance velocity to keep the volumetric melt power constant or stable and thus ensure a reliable melting process or a reliable welding process.

In a further embodiment, the irradiation device has a control device embodied or programmed to actuate the beam-forming device for controlling the length and/or the width of the beam profile and, preferably, the alignment of the first direction and of the second direction of the beam profile (relative to the processing field) depending on the position of the high-energy beam in the processing field. With the aid of the control device, the beam profile of the high-energy beam can be set or controlled dynamically depending on the position of the high-energy beam in the processing field. To this end, the control device resorts to data about the (two-dimensional) geometry, at the respective powder layer to be irradiated, of the three-dimensional component to be produced, wherein the data is stored in a storage device or is predetermined by a programming system. In particular, the control device can split the processing field into a plurality of portions, which are successively irradiated by the high-energy beam.

Should the high-energy beam, more precisely the center thereof, be moved along a portion of a powder layer to be irradiated, for example, with the second direction (i.e., the width) of the beam profile extending in the longitudinal direction of the portion, the length of the beam profile can be adapted at a respective position of the processing field in such a way that the length corresponds to the width of the portion at the respective position. In this way, such a portion can be completely irradiated, even though the high-energy beam is guided only over the portion once in the longitudinal direction. Particularly if a surface region that should not be irradiated is present in a respective portion, it may be advantageous to change the width and/or the alignment of the high-energy beam.

In a another development, the control device is embodied to actuate the beam-forming device to irradiate at least one first, first portion of the processing field to be irradiated for producing a layer of the three-dimensional component by means of the high-energy beam with a beam profile whose length is greater than its width, and to irradiate at least one second, second portion of the processing field to be irradiated for producing the same layer of the three-dimensional component by the high-energy beam with a beam profile whose length and width (approximately) correspond. As described in more detail above, the control device is embodied to identify portions of the processing field (and hence of the corresponding powder layer) to be irradiated on the basis of the geometry of the three-dimensional component to be produced, wherein the portions are irradiated in succession. The first portion can be an area that lies between the contours of the component to be produced while the second portion typically is a contour region or contour line of the component to be produced. In particular, the second portion can be irradiated without the beam profile of the high-energy beam being changed in the process. Preferably, the suitably set beam-forming device serves to produce the beam profile whose length and width correspond. However, it is alternatively also possible to remove the beam-forming device from the beam path to transmit directly a symmetric beam profile produced by a laser source, for example, onto the processing field. In principle, the sequence of irradiating the first and second portions is arbitrary, i.e., one or more of the first portions can be irradiated before or after irradiating one or more of the second portions. In this way, the above-described skin-core strategy for producing a three-dimensional component can be realized.

In particular, it was found to be advantageous if the first and second portions of one and same powder layer are irradiated in the manner described herein, i.e., if also the first, areal portions of each powder layer are melted individually such that the heat can be dissipated or be distributed until the next powder layer is applied and melted, as this increases the quality of the three-dimensional component. In contrast thereto, a large melt volume with very much thermal energy may possibly arise in the method described in DE 199 53 000 A1, in which a plurality of powder layers of an areal portion (of the core) are melted together, which can result in a component to be produced that is possibly warped. Moreover, the employed powder material, as a rule, contains air such that the powder bed suddenly collapses during the simultaneous melting of a plurality of layers and the level of the melt on the carrier may lie significantly lower than the level of the enveloping contour that has already been produced. To compensate for this, it may be necessary to undertake additional powder applying and melting processes in the core, which may possibly at least partly undo the time advantage obtained from melting a plurality of powder layers at once. However, it is understood that, optionally, despite the problems mentioned here, a plurality of powder layers lying above one another in the region of the core (or in the region of first portions lying over one another) may be irradiated together. A further aspect of the invention relates to a processing machine for producing three-dimensional components by irradiating powder layers by means of a high-energy beam, in particular by means of a laser beam, including: an irradiation device as described herein and a processing chamber with a carrier for applying the powder layers. The irradiation device is typically separated from the processing chamber by a protective glass or the like, through which the high-energy beam enters into the processing chamber. Here, the irradiation device is typically arranged in relation to the processing chamber in such a way that the processing field of the scanner device, in which the high-energy beam is focused, corresponds to the position of a powder layer that should be irradiated by means of the high-energy beam. It is understood that the processing machine has further components that facilitate the application of the individual powder layers. If need be, a pressure that is reduced in relation to the surroundings or a vacuum may prevail in the processing chamber; however, it may also be filled with an inert gas that does not react with the powder.

The invention also relates to methods for producing a layer of a three-dimensional component by irradiating a powder layer by means of a high-energy beam, in particular by means of a laser beam. The methods include: (applying the powder layer on a carrier), and irradiating a powder layer by means of the high-energy beam in a processing field for producing the layer of the three-dimensional component, wherein a beam profile of the high-energy beam has a length along a first direction perpendicular to the beam axis of the high-energy beam and a width along a second direction perpendicular to the beam axis of the high-energy beam, wherein the width is optionally smaller than the length, and wherein the length and/or the width of the beam profile of the high-energy beam and, preferably, an alignment of the first direction and the second direction of the beam profile of the high-energy beam (in a plane perpendicular to the beam axis) are changed depending on the position of the high-energy beam in the processing field. It is understood that the powder layer need not be applied directly onto the carrier, but is applied (with the exception of the first powder layer) to an already completed part of the three-dimensional component. The methods described herein for producing a powder layer are typically carried out a number of times in succession, until the three-dimensional component has been completely finished.

The methods described here allow a particularly efficient irradiation of the powder layer to be implemented, as a result of which the construction rate during the production of the three-dimensional component can be increased. In particular, the beam profile of the high-energy beam can always be designed in such a way that the first direction of the beam profile extends perpendicular to the current movement direction or to the current direction of the trajectory of the high-energy beam in the processing field.

In this case, pre-heating and/or post-heating of the irradiated powder layer can be implemented in a particularly simple manner by varying the width of the beam profile in the second direction, which corresponds with the current direction of the trajectory. The heat required for the production process can be supplied particularly effectively by way of the high-energy beam in this case, and so it may be possible to dispense with supplying heat to the powder layer from below (via the carrier).

Optionally, the beam profile of the high-energy beam can be divided into three, for example, in the second direction, i.e., the width of the beam profile has first, second, and third profile regions, between which two profile regions, in which the beam profile has no power or only a vanishingly small power, are present. In this way, less energy may be optionally introduced into the component or into the powder layer than is the case when using conventional methods, as a result of which, typically, possibly occurring warpage in the component during the cooling thereof can be reduced. In principle, more energy can be introduced at once into the powder bed or into the powder layer by the line-shaped irradiation than is the case for punctiform irradiation, as result of which the production process is accelerated. In the case of punctiform irradiation of the powder layer, the maximum amount of energy introduced per unit time is limited by the velocity of the scanner device as too much energy influx at a point or position of the powder layer may lead to warpage of the component or, possibly, to an evaporation of the powder material.

In one variant, the powder layer is irradiated in at least a first portion with a first beam profile, whose length is greater than its width, and the powder layer is irradiated in at least one, second portion using a second beam profile whose length and width correspond. It is understood that the length and, optionally, the width of the first beam profile can vary when the first portion is irradiated and that the alignment of the beam profile may be changed, in particular rotated, when irradiation is carried out. When irradiating the second portion with the high-energy beam with the second beam profile, the second beam profile, as a rule, is not changed to be able to track the contours or the contour lines of the three-dimensional component to be produced.

The invention also relates to methods for producing at least one portion of a layer of a three-dimensional component by irradiating at least one powder layer by means of at least one high-energy beam, in particular by means of at least one laser beam. These methods include: irradiating the powder layer by means of the at least one high-energy beam in a processing field (of a scanner device), wherein the at least one high-energy beam is moved, typically multiple times, in a continuous oscillating movement over the powder layer in a first direction to produce a line-shaped irradiation region, at which the at least one powder layer is melted, and wherein the line-shaped irradiation region is (simultaneously) moved over the powder layer in a second direction that differs from the first to produce the portion of the layer of the three-dimensional component.

In this aspect of the invention, it is proposed to move at least one high-energy beam, which, as a rule, has a substantially round or punctiform beam profile, in a first direction over the powder layer with an oscillating, typically high frequency movement multiple times, i.e., with at least two, typically three or more, complete oscillation or vibration periods of the oscillating movement, to produce a line-shaped irradiation region or a quasi-stationary line, along which the material of the powder layer is melted.

The movement in the two directions is preferably matched to one another in such a way that positions within the line-shaped irradiation region (possibly apart from the positions at the lateral edges of the irradiation region) are scanned multiple times, i.e., at least two times, preferably at least three times, by the laser beam, more precisely by the beam profile thereof. Two regions scanned by the high-energy beam in directly successive oscillations of the oscillating movement overlap, as a rule, by approximately 50% or more. The (continuous) oscillating movement in the first direction has a movement in a second direction (advance direction) superimposed thereon, and so a "line focus" arises, which is moved over the powder layer to produce at least one portion of the layer of the three-dimensional component or, optionally, the entire layer of the three-dimensional component.

Both the oscillating movement of the high-energy beam in the first direction and the movement of the line-shaped irradiation region over the powder layer are preferably implemented by a two-dimensional scanner or a scanner device, which typically has two scanner mirrors to move the high-energy beam in the processing field. Here, in particular, the scanner mirrors facilitate a highly dynamic oscillating movement of the high-energy beam. Here, the three-dimensional component is preferably produced layer-by-layer by selective laser melting or by selective laser sintering.

Preferably, at least one powder layer is irradiated by means of the at least one high-energy beam, preferably by means of the at least one laser beam, in a processing chamber of a processing machine embodied to produce three-dimensional components by irradiating powder layers. The processing chamber has a carrier for applying the powder layers. In particular, the processing machine can be embodied as described herein.

Compared to the methods described in the introductory part of the description, in which adjacent paths are scanned in the opposite direction, wherein the heat influx into the powder material has different magnitudes, the heat can be introduced in substantially more uniform fashion into the powder material along the line or along the line-shaped irradiation region by the fast or high-frequency oscillating movement, because one and the same position is scanned multiple times, as a rule a multiplicity of times, by the at least one high-energy beam. Expressed differently, the heat dissipation is small in comparison with the (high) scanning velocity of the high-energy beam.

Scanning one and the same position multiple times or the overlap between two or more oscillating movements that directly follow one another to the ends of the oscillating movement or of the line-shaped irradiation region, which preferably form an edge section of an area to be illuminated or of the portion of the layer to be produced, leads to the edge section of the illuminated area being able to be formed by a much finer raster than in U.S. Pat. No. 4,863,538, and so the actual edges of the area illuminated in two dimensions or of the portion of the layer correspond to the intended edges very well. As a result of this, the necessity of scanning the edge of the contour with the laser beam in the vector mode within the scope of an additional step may be dispensed with. This advantage is already present in the case of scanning velocities or scanning frequencies that correspond to conventional rastering. Advantageously, the scanning velocity or the scanning frequency of the oscillating movement can be increased, for example to 0.5 kHz or more, for example to 5 kHz. As a rule, the two scanner mirrors of the scanner device may likewise carry out an oscillating movement with at least a frequency of 0.5 kHz, for example 1 kHz or more, in each case.

In one variant, at least two high-energy beams are moved over the powder layer in the first direction with an oscillating movement to produce the line-shaped irradiation region. The use of two or more high-energy beams renders it possible to increase the efficiency of the melting process, since the size of the molten pool can be increased, and/or to introduce more laser power into the interaction zone or into the line-shaped irradiation region.

Two or more high-energy beams can serve to scan the entire length of the line-shaped irradiation region with an oscillating movement. Optionally, a respective high-energy beam can scan only one section of the line-shaped irradiation region with an oscillating movement. Expressed differently, (twice) the amplitude of the oscillating movement of an individual high-energy beam may correspond to the entire length of the line-shaped irradiation region or it may possibly only make up part of the length of the line-shaped irradiation region.

In certain portions of the powder layer, the length of the line-shaped irradiation region may optionally be reduced to a punctiform irradiation (for example, with a beam diameter of less than 1 mm, e.g., 0.1 mm) for producing the layer of the three-dimensional component, for example if a contour line of the three-dimensional component should be produced. Since the geometry of the area of the powder layer to be illuminated depends on the type or the geometry of the three-dimensional component to be manufactured, two or more high-energy beams that are moved independently of one another in the processing field, may allow different individual portions of the powder layer to be irradiated in each case, or two or more of the high-energy beams can together form, in the manner described above, a highly dynamic, typically rotatable, quasi-stationary, line-shaped irradiation region. Particularly if use is made of a plurality of high-energy beams, the method consequently facilitates a high flexibility with respect to the detail accuracy and the construction rate of the three-dimensional component.

The high-energy beams that are incident on the processing field can be produced by a single high-energy beam, for example with the aid of one or more diffractive optical elements. Additionally, use can be made of a scanner device having two or more two-dimensional scanners to align a respective high-energy beam onto the powder layer, said high-energy beam being able to be moved independently of the other high-energy beam or beams along the powder layer. The high-energy beams can be produced by a plurality of beam sources; however, it is also possible to use a single beam source, the power of which is divided among a plurality of high-energy beams.

For the purposes of producing the line-shaped irradiation region with the aid of a plurality of high-energy beams, use can be made of different strategies to influence the melt stability or the melt homogeneity as desired. Additionally, the efficiency or the construction rate of the three-dimensional component can be increased by choosing a suitable strategy when producing the line-shaped irradiation region. By way of example, depending on the chosen strategy, the sections of the line-shaped irradiation region, which are scanned by the oscillating movement of a respective high-energy beam, may adjoin one another, or wholly or partly overlap. It is also possible to select the amplitude of the oscillating movement of different high-energy beams, and hence the length of a respective section, to have the same size or to be different. The oscillating movement of two or more high-energy beams can have a fixed phase relation; by way of example, two high-energy beams can carry out the oscillating movement in the same or in an opposite sense in the first direction. As a result of this, it is possible, for example, to produce a different sense of rotation of the oscillating movements of different high-energy beams. In a further embodiment, the first direction and/or the second direction is/are changed when moving the line-shaped irradiation region over the powder layer. In particular, an angle between the first direction, in which the line-shaped irradiation region extends, and the second direction, i.e., the advance direction, can be varied during the movement over the powder layer. Such a change of the two directions during the irradiation can be realized in a particularly simple manner with the aid of a scanner device that has at least one two-dimensional scanner with two highly dynamically rotatable or tiltable scanner mirrors. By way of a rotation of the scanner mirrors about the two axes of rotation, which is synchronized in a suitable manner, it is possible to select the direction of the line-shaped irradiation region on the processing field and also the advance direction practically without constraints.

In a further embodiment, a length of the line-shaped irradiation region in the first direction is changed when moving the line-shaped irradiation region over the powder layer. In addition or as an alternative to changing the alignment of the first and second direction in the processing field, it is also possible to change, practically without constraints, the length of the line-shaped irradiation region over a comparatively large value range if use is made of a scanner device with at least one two-dimensional scanner, wherein the maximum length of the line-shaped irradiation region is limited by the maximum deflection of the scanner mirrors and can amount to several millimeters, for example approximately 5 mm, and, as a rule, does not exceed a maximum length of approximately 1 cm.

In one embodiment, a (mean) velocity of the high-energy beam during the oscillating movement in the first direction is selected to be at least ten times greater than a velocity of the high-energy beam during the movement of the line-shaped irradiation region in the second direction. As described further above, the (optionally varying) frequency of the oscillating movement lies, as a rule, at more than approximately 0.5 kHz, leading to a velocity, averaged over the vibration period, of typically more than approximately 0.05 m/s. The velocity of the advance movement typically lies at approximately 10% or less, optionally at less than 5% or at less than 0.5% of the velocity of the oscillating movement.

The advance velocity in the second direction typically depends on the length of the line-shaped irradiation region: if the length of the line-shaped irradiation region increases, the advance velocity preferably decreases, and vice versa. The reason for this is as follows: in the case of an unchanging velocity in the first direction, a longer period of time is required to scan a line-shaped irradiation region with a long length than a line-shaped irradiation region with a short length. Therefore, an adaptation of the advance velocity is advantageous to produce an energy influx into the powder layer that is as constant as possible when the power of the high-energy beam should be kept constant, e.g., at maximum power. It is understood that the advance velocity also depends, inter alia, on the diameter of the high-energy beam, which is possibly adjustable in terms of size, on the powder layer; here, greater diameters of the high-energy beam, as a rule, facilitate greater advance velocities, and vice versa.

If the first direction and/or the second direction are changed when moving the line-shaped irradiation region over the powder layer, in particular in the case of cornering, it is necessary, as a rule, to adapt the laser power depending on the position along the line-shaped irradiation region in such a way that the areal energy influx of the high-energy beam into the powder layer has substantially the same magnitude at each location. To this end, it is necessary to adapt the process parameters, in particular the laser power and the scanning velocity(s), possibly leading to a significant outlay in terms of control technology.

To avoid this outlay, it may be advantageous to divide the layer of the three-dimensional component to be produced into a plurality of strip-shaped portions, the width of which—provided these do not adjoin the edge contour of the layer to be produced—typically corresponds to the maximum adjustable length of the line-shaped irradiation region. The strip-shaped portions can be irradiated in succession by means of the high-energy beam to produce the layer of the three-dimensional component. Instead of strip-shaped portions, the layer to be produced can also be split into rectangular or into square portions, for example in the style of checkerboard fields. The (square) portions can likewise be irradiated in succession (i.e., checkerboard field by checkerboard field) by the high-energy beam in this case to produce the layer of the three-dimensional component. The width of the (square) portions corresponds in this case to usually less than ten times the length of the line-shaped irradiation region or less than ten times (twice) the amplitude of the oscillating movement in the first direction.

When irradiating the powder layer with a line-shaped irradiation region whose direction does not change when producing the portion of the layer, too, the average energy per unit area (energy density), as a rule, is not distributed in homogeneous fashion over the length of the line-shaped irradiation region during the oscillating movement, even though this would be advantageous for carrying out the process.

In another embodiment of the methods described herein, the high-energy beam is moved at a constant velocity over the powder layer during the continuous oscillating movement in the first direction, i.e., the scanner movement in the first direction is implemented with a constant velocity. Preferably, the velocity of the movement in the second direction, preferably extending perpendicular to the first direction, is also constant in this case. In this way, a zigzag-shaped trajectory of the high-energy beam overall irradiates the powder layer. Since each position of the oscillating movement is scanned twice at the same velocity in the first direction (except for the reversing points), the same energy density can be introduced at each position along the first direction at all times during the oscillating movement.

In a further embodiment, a power of the high-energy beam at the two reversing points of the continuous oscillating movement is reduced in relation to a power of the high-energy beam between the two reversing points of the continuous oscillating movement. In a real processing machine, the acceleration at a respective reversing point is finite, and so the high-energy beam dwells for longer than desired at the reversing points of the oscillating movement and hence there is an unwanted increased heating of the powder layer at the edge of the oscillating movement. This problem can be solved by virtue of the energy influx as a result of the higher dwell time at the reversing points being at least partly compensated by a reduction in the energy or the power of the high-energy beam at the reversing points. Here, the power at the reversing points can be reduced to less than 40%, less than 30% or less than 20% of the power between the reversing points.

Even in the case of an ideal zigzag-shaped trajectory, i.e., in the case of a constant scan velocity and hence homogeneously distributed energy, on average, in the first direction, there may be an inhomogeneous energy influx in the second direction (i.e., in the advance direction): by way of example, if the high-energy beam has a narrow Gaussian beam profile in comparison with the advance or with the advance velocity per oscillating movement, less energy may be introduced in regions that lie between adjacent reversing points in the second direction than at the reversing points, while the energy influx centrally between the reversing points of the oscillating movement is substantially more homogeneous. This may lead to the powder material being heated further above the melting temperature than necessary at the reversing points, leading to a disturbed process.

This problem can be solved as described herein, i.e., by a high velocity of the oscillating movement in the first direction in comparison with the velocity in the second direction (advance direction), i.e., by virtue of the movement of the high-energy beam in the two directions. More precisely, the velocities of the high-energy beam in the two directions can be matched to one another in such a way that positions within the line-shaped irradiation region are scanned at least two times, preferably at least three times, by the high-energy beam. However, this procedure is limited by the maximum attainable velocity of the scanner movement, and so, possibly, the construction rate of the three-dimensional workpiece must be reduced for the purposes of producing an energy influx per unit area that is as homogeneous as possible.

In another embodiment, the continuous oscillating movement in the first direction has superimposed thereon a further continuous oscillating movement in the second direction that differs from the first, in particular that is perpendicular to the first. The further continuous oscillating movement leads to the high-energy beam scanning a trajectory, e.g., in the form of a spiral, when irradiating the powder layer. As a rule, the amplitude of the further oscillating movement is significantly lower than the amplitude of the oscillating movement that—if use is made of a single high-energy beam—corresponds to the length of the line-shaped irradiation region. By way of example, the ratio between the amplitude of the further oscillating movement and the amplitude of the oscillating movement can lie between approximately 1:3 and 1:10. In addition to the oscillating movement in the second direction, there is an advance in the second direction to move the line-shaped irradiation region over the powder layer in the second direction. Consequently, the velocity in the second direction has a non-oscillating, e.g., temporally constant component and an oscillating component.

In a development of this variant, the oscillating movement in the first direction is implemented at a first oscillation frequency and the further oscillating movement in the second direction is implemented at a second oscillation frequency, said second oscillation frequency being an integer multiple of the first oscillation frequency, wherein the second oscillation frequency preferably corresponds to the first oscillation frequency. In this case, the high-energy beam is typically guided over the powder layer in the form of a spiral movement. Provided that the two oscillation frequencies correspond, the two oscillation movements can have a constant phase relation or a constant phase shift. However, it is understood that a constant phase relation between the two oscillating movement is not mandatory.

In a further embodiment, a phase shift between the oscillating movement in the first direction and the further oscillating movement in the second direction lies at $\pi/2$ (i.e., at 90°). If the additional oscillating movement has a phase shift of 90° to the oscillating movement, the additional oscillating movement has its maximum velocity when the axis of the scanner device in the first direction is at a standstill (i.e., at minimum velocity), and so, typically, a substantially more homogeneous energy influx into the powder layer is obtained in the second direction without, to this end, the power of the high-energy beam having to be changed. However, in this case as well, such a reduction of the power of the high-energy beam, at least in the region of the reversing points, is advantageous for additional homogenization of the energy influx in the first direction.

A further aspect of the invention relates to computer program products having coding means adapted to carry out all steps of the methods for producing the layer or at least one portion of the layer when the program is executed on a data processing installation. By way of example, the data processing installation can be a control device of the irradiation device or the processing machine. In particular, the computer program products can be one or more non-transitory computer-readable media storing instructions that are executable by a processing machine configured to produce three-dimensional components by irradiating powder layers, and upon such execution cause the processing machine to perform operations including irradiating at least one powder layer with at least one high-energy beam in a processing field; moving the at least one high-energy beam in a continuous oscillating movement over the powder layer in a first direction to produce a line-shaped irradiation region in which the powder layer is melted; and moving the line-shaped irradiation region over the powder layer in a second direction that differs from the first direction to produce the portion of the layer of the three-dimensional component. Other method elements as described herein can be included in the instructions stored by the computer-readable media.

Further advantages of the invention emerge from the description and the drawings. Likewise, the features mentioned above and the features explained below may find use, either respectively on their own or in any combination, when a plurality of them are grouped together. The embodiments that are shown and described herein should not be understood to be a comprehensive list but, instead, should be seen to have an exemplary character for explaining the invention.

DESCRIPTION OF DRAWINGS

FIG. 10 is an illustration of a laser beam moved in a zigzag-shaped trajectory over the powder layer.

FIGS. 11A and 11B are two illustrations of the movement of a laser beam moved over the powder layer in a spiral-shaped trajectory.

DETAILED DESCRIPTION

Figure 1:
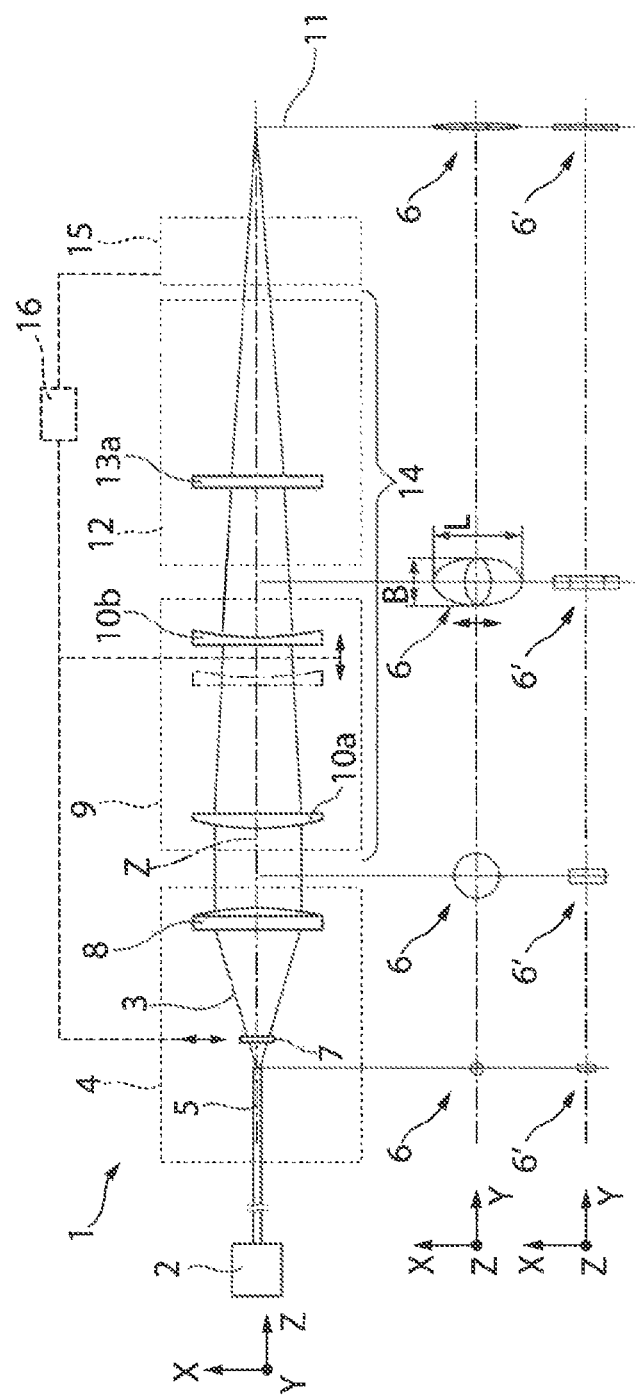
FIG. 1 is a schematic illustration of an irradiation device having a beam-forming device, which has a first adjustable beam telescope for changing the length of a beam profile of a laser beam.

FIG. 1 shows an exemplary structure of an irradiation device 1, which has a beam source 2 in the form of a laser source, for example in the form of an Nd:YAG laser or a fiber laser, for producing a laser beam 3. The irradiation device 1 has a collimation device 4 for collimating the laser beam 3, said collimation device including an optical fiber 5 for guiding the laser beam 3 proceeding from the light source 2. The laser beam 3 emerges divergently at an end of the optical fiber 5 distant from the beam source 2. The beam axis Z of the laser beam 3 corresponds in the example shown in FIG. 1 to the Z-axis of an XYZ-coordinate system.

The beam profile of the laser beam 3 at the end side of the emergence-side end of the optical fiber 5 is determined, inter alia, by the cross-sectional geometry of the optical fiber 5. Illustrated at the bottom of FIG. 1, there is a beam profile 6 of the laser beam 3 at different points in the beam path of the irradiation device 1, illustrated at the top in FIG. 1, for an optical fiber 5 with a circular cross section. For comparison purposes, a beam profile 6' of the laser beam 3 if use is made of an optical fiber 5 with a rectangular cross-section is illustrated further down in FIG. 1. The beam profile 6, 6' of the laser beam 3 is illustrated in each case in a plane XY perpendicular to the beam axis Z of the laser beam 3. It is understood that the laser beam 3 may also have a different beam profile, for example a multimode beam profile or top hat beam profile.

The laser beam 3 divergently emerging from the optical fiber 5 initially passes through an optical element 7, which may be embodied as a protective glass, for example, which is applied to a housing, not illustrated in FIG. 1, of the irradiation device 1 and said laser beam subsequently strikes a collimation lens element 8, which is a plano-convex lens element in the shown example, for collimating the laser beam 3. It is understood that one or more other typically spherical lens elements, e.g., biconvex lens elements, can also be used for collimating the laser beam 3. The beam profile 6, 6' of the laser beam 3 after the collimation lens element 8 corresponds to the (enlarged) beam profile 6, 6' of the laser beam 3 at the exit of the optical fiber 5.

In the example shown in FIG. 1, the irradiation device 1 has a first beam telescope 9, which includes a first cylindrical lens element 10a and a second cylindrical lens element 10b, which are arranged in succession in the beam path of the collimated laser beam 3. The two cylindrical lens elements 10a, 10b of the first beam telescope 9 have a cylindrical symmetry with an axis of symmetry that extends in the Y-direction, and so the two cylindrical lens elements 10a, 10b influence the beam profile 6, 6' of the laser beam 3 in the X-direction but not in the Y-direction. The first cylindrical lens element 10a has a plano-convex design and produces a laser beam 3 that is convergent in the X-direction from the laser beam 3 impinging in collimated fashion. The first cylindrical lens element 10a has a focal length $f_1$, chosen in such a way that the first cylindrical lens element 10a focuses the laser beam 3 onto a plane illustrated to the right in FIG. 1, a processing field 11 being formed in said plane. Subsequently, the converging laser beam 3 strikes the second, plano-concave cylindrical lens element 10b of the first beam telescope 9, which has a focal length $f_2$ and which slightly widens the laser beam 3 that is convergent in the X-direction in the X-direction.

The second cylindrical lens element 10b is displaceable in the direction of the beam axis Z of the laser beam 3 by means of a drive, which is indicated in FIG. 1 by a double-headed arrow. By displacing the second cylindrical lens element 10b in the direction of the beam axis Z, it is possible to change the length L of the beam profile 6, 6' of the laser beam 3 in a first direction (X-direction), as likewise indicated by a double-headed arrow in FIG. 1. The comparatively small travel when displacing the second cylindrical lens element 10b ensures that the laser beam 3 is always focused onto the processing field 11. In the example shown in FIG. 1, the (variable) length L of the beam profile 6, 6' along the first direction (X-direction) is greater than the (constant) width B of the beam profile 6, 6' along the second direction (Y-direction); however, it is understood that, optionally, it is also possible by displacing the second cylindrical lens element 10b to produce a beam profile 6, 6', in which the length L and the width B correspond or whose length L is shorter than the width B thereof such that the first direction (X-direction) and the second direction (Y-direction) change their roles in this case.

In the irradiation device 1 shown in FIG. 1, a further cylindrical lens element 13a is arranged in the beam path after the first beam telescope 9, the further cylindrical lens element being arranged with a 90° rotation in relation to the two cylindrical lens elements 10a, 10b of the first beam telescope 9 in a plane XY perpendicular to the beam axis Z of the laser beam 3. Consequently, the cylinder axis of the further cylindrical lens element 13a extends in the X-direction, which is why the further cylindrical lens element 13a changes the beam profile of the laser beam 3 in the Y-direction but not in the X-direction. The further cylindrical lens element 13a has a focal length f3 that is chosen such that the laser beam 3 that is still collimated in the Y-direction after the first beam telescope 9 is also focused on the processing field 11 in the X-direction. A scanner device 15 arranged between the further cylindrical lens element 13a and the processing field 11 serves to align the laser beam 3 at an adjustable position in the processing field 11, as described in more detail further below.

The irradiation device 1 shown in FIG. 1 images the beam profile 6, 6' in an XY-plane at the end side of the emergence-side end of the optical fiber 5 onto the XY-plane, in which the processing field 11 is formed. Together with the further cylindrical lens element 13a, the first beam telescope 9 forms a beam-forming device 14, which renders it possible to change or set the length L of the beam profile 6, 6' of the laser beam 3 by displacing the second cylindrical lens element 10b of the first beam telescope 9. Optionally, the first cylindrical lens element 10a can be dispensed with in the irradiation device 1 shown in FIG. 1, i.e., the laser beam 3 strikes the (second) cylindrical lens element 10b in collimated fashion. In this case, the collimation lens element 8 forms a first beam telescope 9 together with the (second) cylindrical lens element 10b. The width B of the beam profile 6, 6' of the laser beam 3 cannot be changed with the aid of the irradiation device 1 shown in FIG. 1.

Figure 2:
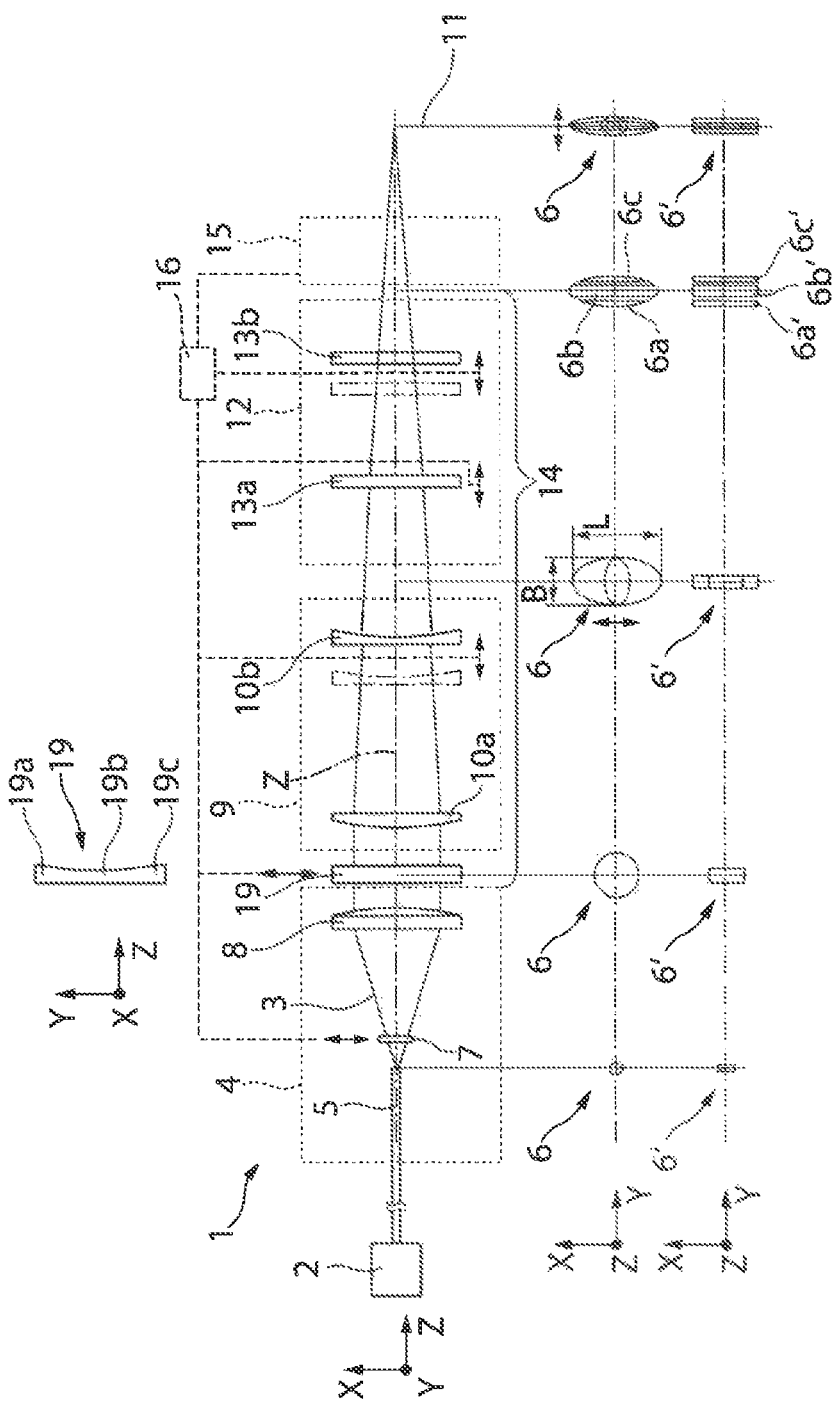
FIG. 2 is an illustration of an irradiation device analogous to one shown in FIG. 1, which additionally has a second adjustable beam telescope for changing the width of the beam profile.

FIG. 2 shows an irradiation device 1, which differs from the irradiation device 1 shown in FIG. 1 in that the beam-forming device 14 has a second further cylindrical lens element 13b, which forms a second beam telescope 12 with the (first) further cylindrical lens element 13a. The second further cylindrical lens element 13b has a cylinder axis extending in the X-direction like the first further cylindrical lens element 13a, and so it influences the laser beam 3 only in the Y-direction but not in the X-direction. The further second cylindrical lens element 13b is displaceable along the beam axis Z of the laser beam 3 by means of a drive device indicated by a double-headed arrow. As in the case of the first cylindrical lens element 10a of the first beam telescope 9, the first further cylindrical lens element 13a of the second beam telescope 12 can be a plano-convex lens element, for example. As in the case of the second cylindrical lens element 10b of the first beam telescope 9, the second further cylindrical lens element 13b of the second beam telescope 12 can be a plano-convex lens, for example. By displacing the second further cylindrical lens element 13b of the second beam telescope 12, it is possible to set the width B of the beam profile 6, 6' of the laser beam 3 along the second direction (Y-direction).

In addition to the second further cylindrical lens element 13b of the second beam telescope 12, it is optionally also possible to move the first further cylindrical lens element 13a of the second beam telescope 12 in the beam direction Z of the laser beam 3. Optionally, only one further first cylindrical lens element 13a is provided in the beam-forming device 14, which forms a second beam telescope 12 together with the collimation lens 8. In the exemplary embodiment shown in FIG. 2, it is possible to change or set both the length L and the width B of the beam profile 6, 6'. In particular, by changing both the length L and the width B, it is possible to set a beam profile 6, 6' of the laser beam 3 in which the length L corresponds to the width B. A change in the orientation of the beam profile in the XY-plane perpendicular to the beam axis Z is not possible, however, using the irradiation device 1 shown in FIG. 2.

Figure 3:
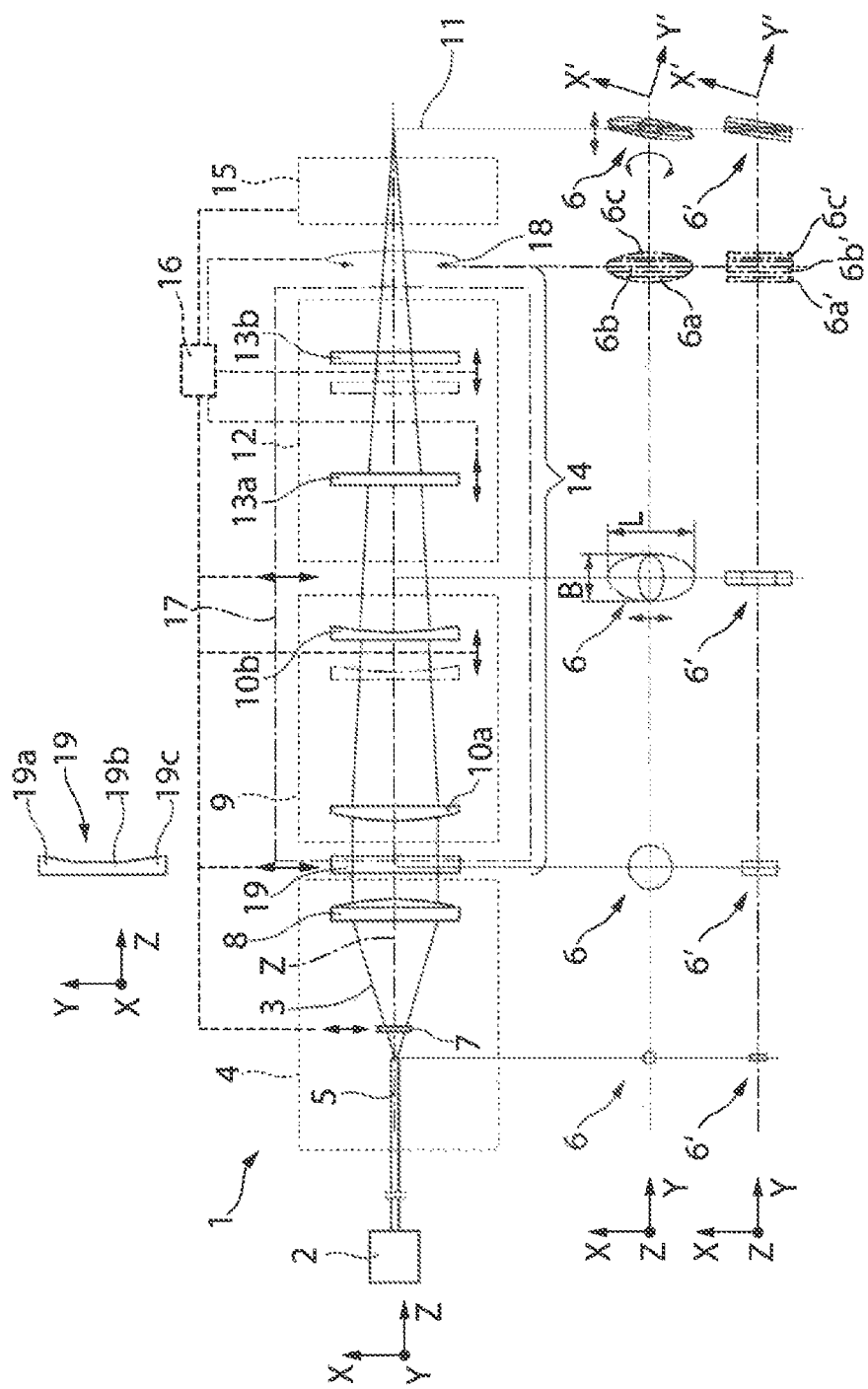
FIG. 3 is an illustration of an irradiation device analogous to one shown in FIG. 2, in which the first and second beam telescopes are rotatably mounted about a beam axis of the laser beam.

Such a change in the orientation of the beam profile 6, 6' of the laser beam 3 in the form of a rotation of the first direction X and the second direction Y perpendicular to the beam axis Z of the laser beam 3 is possible in the irradiation device 1 shown in FIG. 3. FIG. 3 shows, at the bottom right, the respectively resultant beam profile 6, 6' of the laser beam 3 after the rotation, the laser beam having a new first direction X' and a new second direction Y', which extend at an angle, i.e., which are rotated, in relation to the first direction X and the second direction Y in front of the beam-forming device 14 in the XY-plane.

To bring about the rotation of the beam profile 6, 6' of the laser beam 3 about the beam axis Z, the entire beam-forming device 14 shown in FIG. 3 can be rotated about the beam direction Z of the laser beam 3. To this end, the first beam telescope 9 and the second beam telescope 12 are rotatably mounted, with the rotatable mount in the shown example being realized by virtue of the first and second beam telescope 9, 12 being arranged on a common holder 17, which is mounted in a manner rotatable about the beam axis Z. The irradiation device 1 has a rotational drive 18, which is embodied to rotate the holder 17, and hence the two beam telescopes 9, 12, about the beam axis Z.

The actuation of the drives for the cylindrical lens elements 10b, 13a, 13b or for the rotational drive 18 is undertaken by a control device 16, which also actuates the scanner device 15 to align the laser beam 3 at an adjustable or desired position $X_P$, $Y_P$ (see FIG. 4) on the processing field 11, as described in more detail further below. In particular, the control device 16 serves to change or set the respective drives for the cylindrical lens elements 10b, 13a, 13b and the rotational drive 18 depending on the position $X_P$, $Y_P$ of the laser beam 3 in the processing field 11 and consequently change or set the length L and/or the width B of the beam profile 6, 6' and, optionally, the alignment of the beam profile 6, 6' perpendicular to the beam direction Z of the laser beam 3. It is understood that this setting also depends on the geometry of the three-dimensional component to be produced or the (virtual) split of the region to be irradiated into portions, as explained in more detail further below. It is also understood that changing the alignment of the beam profile 6, 6' may also take place in the case of an irradiation device 1 that facilitates only a change in the length L of the beam profile 6, 6' but no change in the width B of the beam profile 6, 6', as is the case in the irradiation device 1 shown in FIG. 1.

Figure 4:
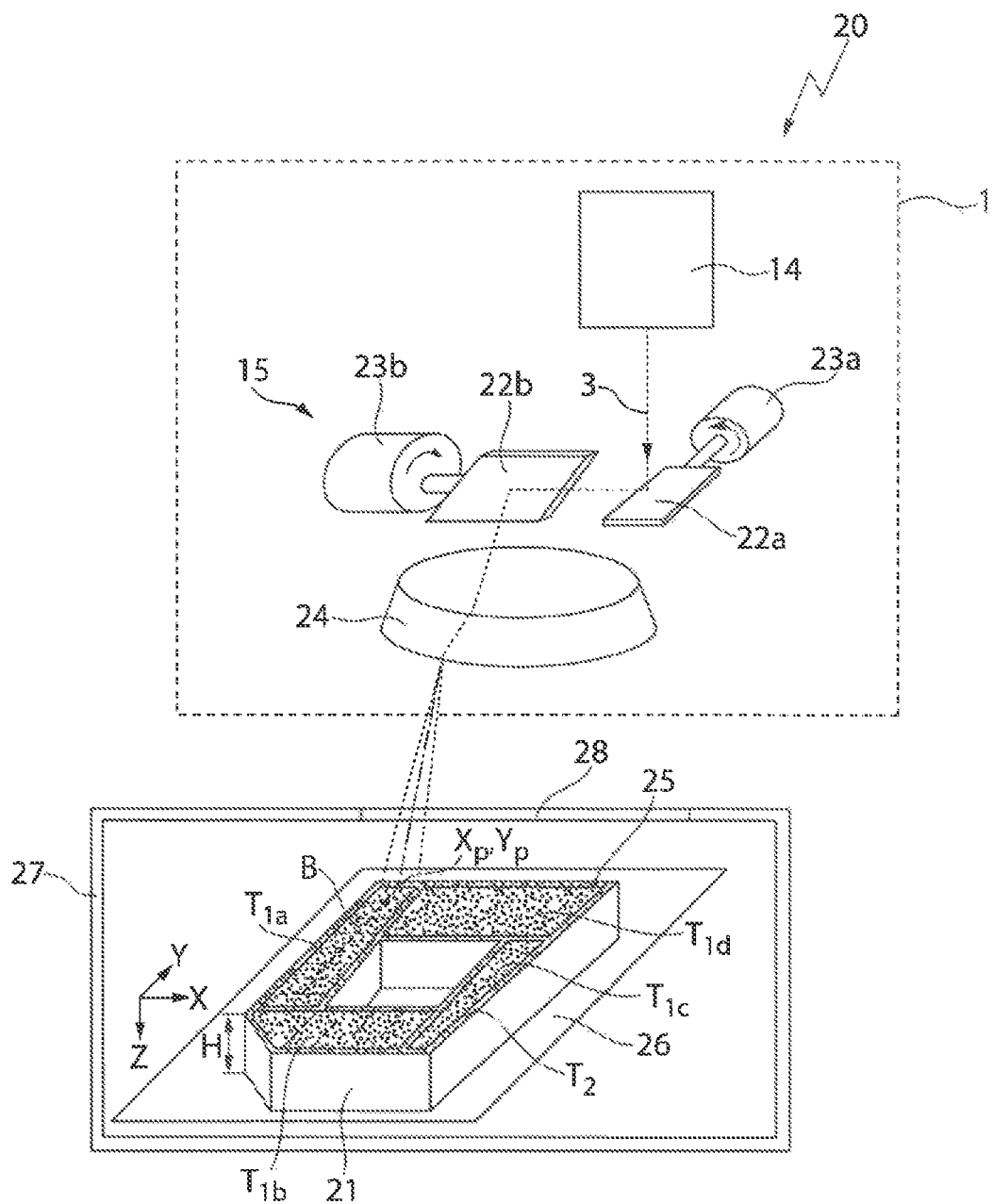
FIG. 4 is an illustration of a processing machine for producing three-dimensional components, which has an irradiation device according to FIGS. 1 to 3.

The irradiation device 1 shown in FIG. 1 to FIG. 3 can be used in a processing machine 20 for producing three-dimensional components 21, which is illustrated in an exemplary manner in FIG. 4. In the shown example, the scanner device 15 of the irradiation device 1 has a first and a second scanner mirror 22a, 22b, which are rotatable about two axes of rotation by means of associated rotational drives 23a, 23b, said axes of rotation, for example, being able to correspond to the X-direction and the Y-direction, respectively, of an XYZ-coordinate system. In the beam path, the scanner device 15 is followed by a lens 24, which additionally undertakes a focusing of the laser beam 3 to focus the laser beam 3 deflected by the scanner device 15 into a processing field 11 (see FIGS. 1 to 3). Here, the lens 24 does not undertake any homogenization so as not to change the beam profile 6, 6'. The processing field 11 corresponds to an XY-plane, in which an uppermost powder layer 25, shown in FIG. 4, of a powder bed applied to a carrier 26, e.g., a carrier plate, is arranged. The carrier 26 is arranged in a processing chamber 27, which has a viewing window 28 for the passage of the laser beam 3.

The lens 24 also serves, inter alia, to align the beam axis Z of the laser beam 3 emanating from the lens 24 substantially perpendicular to the XY-plane or to the powder layer 25, independently of the position $X_P$, $Y_P$ on the processing field 11, which, in the case of a suitable positioning of the irradiation device 1, with the XY-plane corresponds to the powder layer 25 arranged at a predetermined height H above the carrier 26. It is understood that, unlike what is shown in FIG. 4, the powder layer 25 is not only restricted to the top side of the already completed part of the three-dimensional component 21 but rather forms the uppermost layer of a powder bed, which extends over the entire upper side of the carrier 26 up to the height H.

The powder layer 25, more precisely the region of the powder layer 25 shown in FIG. 4, which is intended to be irradiated for producing an additional layer of the three-dimensional component 21 and which therefore corresponds to the geometry of the component 21 to be produced, is split in the example shown in FIG. 4 in a virtual fashion by the processing machine 20, for example by the control device 16 of the irradiation device 1, into four areal first portions $T_{1a}$, $T_{1b}$, $T_{1c}$, $T_{1d}$ and into a second portion $T_2$, which substantially contains the inner and outer contour lines of the component 21 at the corresponding height H and further contour lines lying in the interior, which separate the first portions $T_{1a}$, ..., $T_{1d}$ from one another.

The first portions $T_{1a}$, ..., $T_{1d}$ have a substantially strip-shaped or rectangular design, wherein the length L of the beam profile 6, 6' of the laser beam 3 in the respective portion $T_{1a}$, ..., $T_{1d}$ is no greater on the processing field 11 or the powder layer 25 than the maximum length L that is adjustable by means of the beam-forming device 14. The first portion $T_{1a}$ of the processing field 11 or of the powder layer 25 is irradiated with a beam profile 6, 6', the length of which L (in the X-direction) is significantly greater than its width B; i.e., it is irradiated with a line-shaped beam profile 6, 6'. Here, the position $X_P$, $Y_P$ of the center of the beam profile 6, 6' of the laser beam 3 is moved along a trajectory B that, in the Y direction, extends along the center of the first portion $T_{1a}$. The length L of the beam profile 6, 6' of the laser beam 3 extends perpendicular to the direction of the trajectory B (i.e., in the X-direction) and the length L is dynamically adapted depending on the position $X_P$, $Y_P$ of the laser beam on the processing field 11 in such a way that said length corresponds to the respective extent (or the width) of the first portion $T_{1a}$ in the X-direction. In this way, the first portion $T_{1a}$ is entirely irradiated without a direction reversal of the laser beam 3 being required. The line-shaped beam profile 6, 6' of the laser beam 3 is illustrated with dashed lines at a plurality of positions in an exemplary manner in the first portion $T_{1a}$.

Accordingly, the second portion $T_{1b}$ is also irradiated by means of the laser beam 3, wherein, in the shown example, the alignment of the beam profile 6, 6' is rotated in the XY-plane, to be precise by 90°, between the irradiation of the first areal portion $T_{1a}$ and the irradiation of the second areal portion $T_{1b}$. In this way, the second areal portion $T_{1b}$ of the processing field 11 or the powder layer 25 can be irradiated in a manner analogous to the first areal portion $T_{1a}$; i.e., it is possible to change the length L of the (rotated) beam profile 6, 6' while the laser beam 3, more precisely the center of the beam profile 6, 6', moves along a straight line that extends along the center of the second areal portion $T_{1b}$ in the X-direction.

Accordingly, the third and fourth areal portion $T_{1c}$, $T_{1d}$ can also be irradiated by a suitable rotation of the beam profile 6, 6'. As an alternative or in addition to a rotation of the beam profile 6, 6', the areal portions $T_{1a}$, ..., $T_{1d}$ can be irradiated in the manner described further above, without there being a rotation of the beam profile 6, 6' to this end.

Optionally, the geometry of the areal portions $T_{1a}$, ..., $T_{1d}$ can be adapted in a suitable manner in this case. By way of example, if use is made of the irradiation device 1 shown in FIG. 1, which only provides a change of the length L of the beam profile 6, 6' in the X-direction, there can be a split of the region of the powder layer 25 to be irradiated into a plurality of areal portions $T_{1a}$, ... that extend in the Y-direction with their longitudinal side, the width of which in the X-direction is no greater in each case than the maximum adjustable length L of the beam profile 6, 6' in the X-direction. Optionally, it is possible to set or change not only the length L and/or the width B of the beam profile 6, 6', but also the alignment of the beam profile 6, 6' perpendicular to the beam axis Z when irradiating a single areal portion $T_{1a}$, ..., $T_{1d}$.

The second portion $T_2$ is irradiated after irradiating the areal first portions $T_{1a}$, ..., $T_{1d}$, for the purposes of which the beam profile 6, 6' of the laser beam 3 is set in the shown example by means of the beam-forming device 14 in such a way that the length L and the width B of the beam profile 6, 6' correspond. The length L (and, correspondingly, the width B) is moreover set to less than approximately 1.0 mm, preferably to less than 100 µm, in particular to several 10 µm by means of the beam-forming device 14. In this way, the second portion $T_2$ of the powder layer 25, which contains the contour lines, can be irradiated by means of a substantially punctiform laser beam 3. It is understood that, alternatively, the second portion $T_2$ can also be irradiated before irradiating the areal first portions $T_{1a}$, ..., $T_{1d}$. Optionally, the beam-forming device 14 can alternatively be removed from the beam path of the laser beam 3 and, for example, be replaced by a focusing lens element for irradiating the second portion $T_2$ to obtain a beam profile 6 in which the length L and the width B correspond. The powder layer 25 irradiated entirely in the manner described above in correspondence with the skin-core method forms a (further) layer of the three-dimensional component 21.

By means of an application device not illustrated here, for example using a squeegee, it is possible to take a substance present in powder form, for example a metal powder, from a storage container of the processing machine 20 to apply a further powder layer 25 to the powder bed with the three-dimensional component 21, which has already been completed up to the height H. This process can be continued until the three-dimensional component 21 has been fully completed. Depending on the current area of the beam profile 6, 6' of the laser beam 3 in the processing field 11, there may also optionally be an adaptation of the power of the laser beam 3 during the irradiation. Here, the control device 16 can couple the current surface power, which depends on the current laser power and the current length and width of the beam profile 6, 6' to the advance velocity in such a way that the volumetric melt power is kept constant or stable, in this way allowing a reliable melting process or reliable welding process to be ensured.

In addition to changing the length L and/or the width B of the beam profile 6, 6' of the laser beam 3, the beam profile 6, 6' can be changed by virtue of the beam profile 6, 6' being changed by means of a further optical element 19, which can be selectively introduced into the beam path of the laser beam 3 after the collimation lens 8 (or optionally at a different point) or removed therefrom, as shown in FIG. 2 and in FIG. 3. It is understood that such an additional change in the beam profile 6, 6' can also be brought about in the irradiation device 1 shown in FIG. 1.

In the shown example, the further optical element 19 is embodied to split the beam profile 6, 6' of the laser beam 3 into a first profile region 6a, 6a', a second profile region 6b, 6b' and a third profile region 6c, 6c' along the second direction Y, i.e., along its width B, said profile regions in each case being separated by profile regions lying therebetween in which the beam profile 6, 6' only has a very low power, as illustrated in FIG. 2. For the split of the beam profile 6, 6', the further optical element 19 is embodied as a wedge plate in the shown example and it has two wedge-shaped sections 19a, 19c with plane faces arranged at an angle to the beam axis Z, said faces being arranged laterally adjacent to a central, completely plane plate region 19b. The parts of the beam profile 6, 6' that strike the wedge-shaped sections 19a, 19c are respectively deflected to the outside, i.e., away from the beam axis Z, in the Y direction and these form the first and third profile region 6a, 6a' and 6c, 6c'. The part of the beam profile 6, 6' that passes through the plane plate region 19b forms the second, central profile region 6b, 6b' of the beam profile 6, 6'.

Such a split of the beam profile 6, 6' in the second direction (Y-direction) can serve to produce pre-heating or post-heating of the component 21 to be produced or the powder layer 25. The portion of the power of the laser beam 3 that is apportioned to the first, second or third profile region 6a, 6a'; 6b, 6b'; 6c, 6c' is predetermined in the shown example by the geometry of the further optical element 19 in the form of the wedge plate. If need be, the portions can be slightly changed by virtue of the position of the wedge plate 19 being changed in the Y-direction. As an alternative to the wedge plate 19, provision can be made, for example, of two wedge-shaped optical elements in the beam-forming device 14 for the purposes of splitting the beam profile, said wedge-shaped optical elements being embodied analogously to the wedge-shaped sections 19a, 19c of the wedge plate 19 and being able to be displaced independently of one another in the Y-direction. As a result of the independent displacement of the wedge-shaped optical elements into or out of the beam path of the laser beam 3, it is possible to set the portion of the power of the laser beam 3, and hence the desired energy influx, during pre-heating or post-heating in a targeted manner. By way of example, a high portion, e.g., more than 70%, of the entire power of the laser beam 3 can be apportioned to the second, central profile region 6b, 6b', while a lower portion of the entire power of the laser beam 3 is apportioned to the first and the third profile region, respectively.

Depending on whether or not the additional forming or splitting of the beam profile 6, 6' by means of the further optical element 19 is desired, the further optical element 19 can be introduced into the beam path of the laser beam 3, or retracted therefrom, by means of a drive indicated in FIG. 2 and FIG. 3 by a double-headed arrow. The introduction and removal of the further optical element 19 optionally can be implemented depending on the position $X_P$, $Y_P$ of the laser beam 3 on the processing field 11. Thus, for example, the areal first portions $T_{1a}, \ldots, T_{1d}$ can be irradiated by a further optical element 19 introduced into the beam path, whereas the second portion $T_2$ can be irradiated without a further optical element 19 introduced into the beam path of the laser beam 3.

It is understood that, optionally, a rotation of the further optical element 19 can be implemented together with the holder 17 that is rotatable about the beam axis Z in the irradiation device 1 shown in FIG. 3 or that the further optical element 19 can be positioned on the holder 17 that is rotatable about the beam axis Z. As an alternative or in addition thereto, the optical element 7 shown in FIGS. 1 to 3 can be used for additional forming, in particular for splitting, the beam profile 6, 6', said optical element being arranged upstream of the collimation lens element 8 in the beam path if it is embodied as a diffractive optical element, for example. In this case, as described further above, the diffractive optical element 7 can be introduced into the beam path, or retracted therefrom, by means of a drive, depending on whether additional forming of the beam profile 6, 6' is desired or not.

In the irradiation device 1 described in FIGS. 1 to 4, the production of a three-dimensional component 21 in the manner described further above can be implemented with a higher construction rate than is the case in conventional processing machines used to this end. Moreover, since no reversal of direction is required, the scanner device 15 can be embodied to be less dynamic and therefore more cost-effective than in the case of conventional processing machines. Optionally, the use of a lens, for example the lens 24 shown in FIG. 4, may be dispensed with here; i.e., focusing is brought about exclusively by the scanner device 15.

Figure 5:
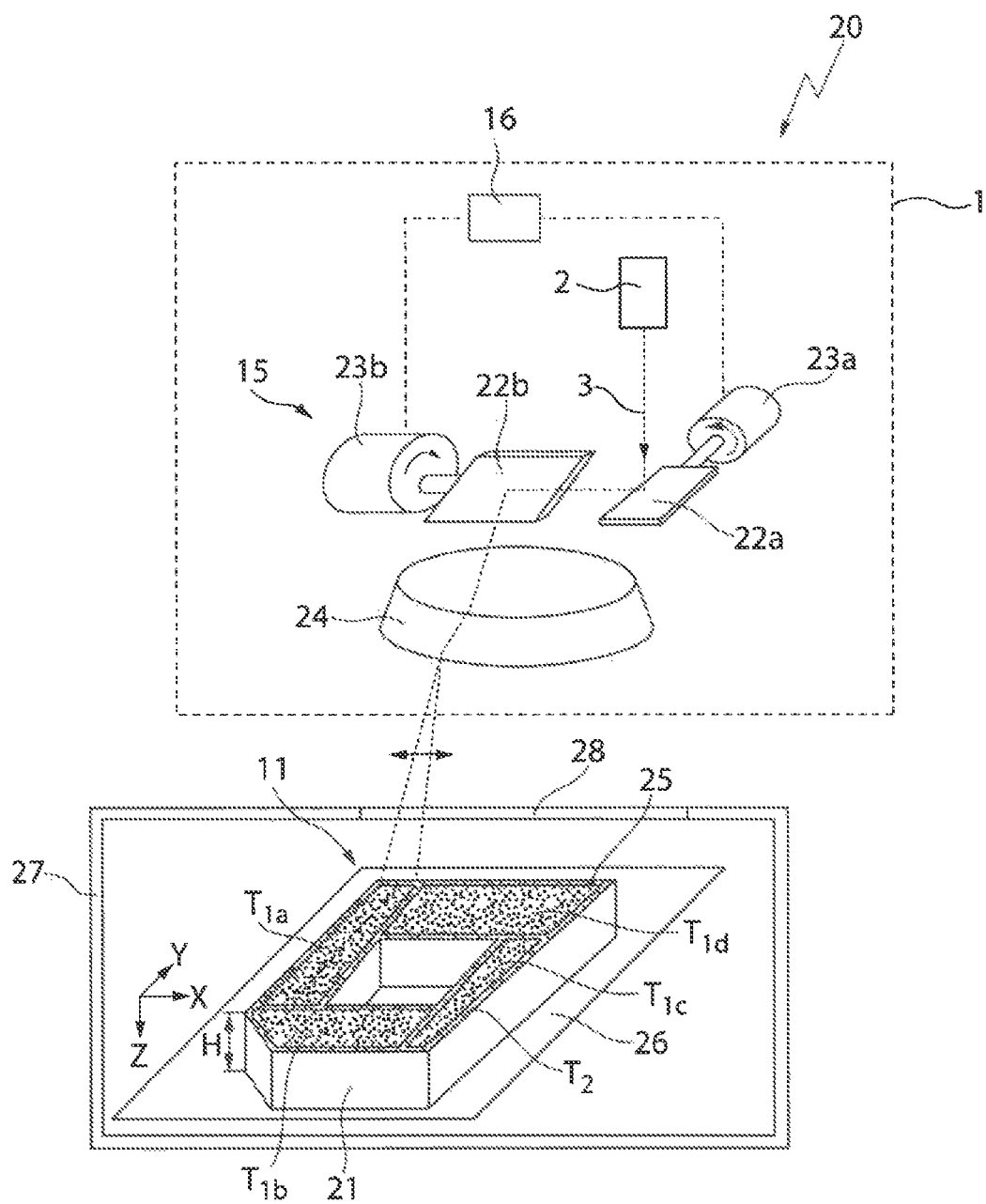
FIG. 5 is an illustration of a processing machine analogous to one shown in FIG. 4, which has an irradiation device with a scanner device, but without a beam-forming device.

FIG. 5 shows a processing machine 20 that likewise facilitates the production of a three-dimensional component 21 with a higher construction rate. The processing machine 20 of FIG. 5 differs from the processing machine 20 shown in FIG. 4 in that the irradiation device 1 does not have a beam-forming device. The laser beam 3 produced by the beam source 2 is consequently radiated without a change in the beam profile thereof and consequently radiated with a typically circular or round beam cross section or "spot" onto the processing field 11, more precisely the uppermost powder layer 25, with the aid of the scanner device 15.

Figure 6A:
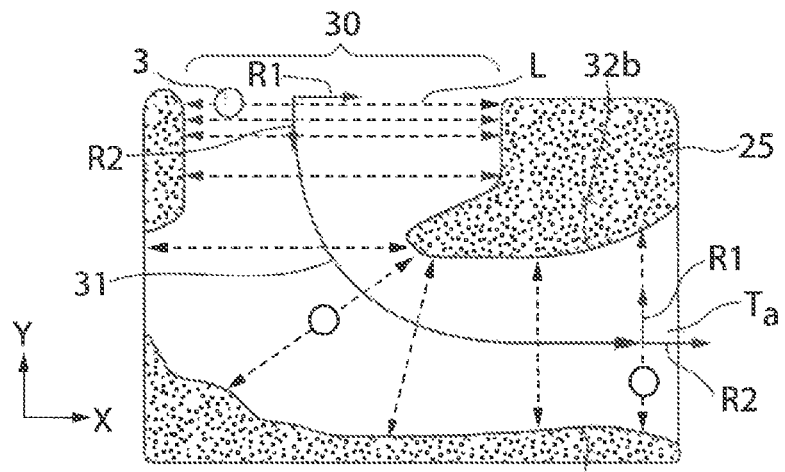
FIGS. 6A and 6B are illustrations of a powder layer with a line-shaped irradiation region produced by an oscillating movement of a laser beam or three laser beams and which is moved along an advance direction.

FIG. 6A shows a section of the uppermost powder layer 25 with a portion $T_a$ of a layer of the three-dimensional component 21 of FIG. 5 to be generated and with the laser beam 3, more precisely with the punctiform beam profile thereof. As indicated by a dashed double-headed arrow in FIG. 6A, the laser beam 3 is moved many times with an oscillating movement in a first direction R1 (X-direction) over the powder layer 25 in a continuous manner, wherein a line-shaped irradiation region 30 is produced, in which the powder layer 25 is melted. The line-shaped irradiation region 30, which is initially produced at an upper end of the portion $T_a$ in FIG. 6A, is moved in a second direction R2, which differs from the first, over the powder layer 25 along a trajectory 31, indicated in FIG. 6A, until the portion $T_a$ with the desired geometry is completely melted and consequently the first portion $T_a$ of the layer of the three-dimensional component 21 is produced in its entirety.

As may be identified in FIG. 6A, the first direction R1 and the second direction R2 are continuously changed during the movement of the line-shaped irradiation region 30 over the powder layer 25, and so the first direction R1 at the upper end of the portion $T_a$ in FIG. 6A corresponds to the X-direction of the (stationary) processing field 11, while the first direction R1 at the right end of the portion $T_a$ corresponds to the Y-direction of the processing field 11, i.e., both directions R1, R2 are rotated through 90°

The second direction R2, i.e., the advance direction, corresponds to the (negative) Y-direction of the processing field 11 at the upper end of the powder layer 25 and it is likewise continuously rotated through 90° during the movement of the line-shaped irradiation region 30 such that the second direction R2 at the right end of the portion $T_a$ corresponds to the X-direction of the irradiation field 11. As likewise indicated in FIG. 6A, the two directions R1, R2 are not necessarily aligned perpendicular to one another during the movement of the line-shaped irradiation region 30 over the powder layer 25; rather, the angle at which the two directions R1, R2 are aligned to one another in the processing field 11 can vary during the movement over the powder layer 25. Here, the power of the laser beam 3 is preferably regulated during the oscillating movement in such a way that the area to be illuminated or the portion $T_a$ experiences an energy influx that is constant over the area. In the example above, in which the line-shaped irradiation region 30 is moved along a "left turn," the power during the movement along the trajectory 31 is reduced in the positive X- and Y-direction and increased in the negative X- and Y-direction.

As can likewise be identified in FIG. 6A, the length L of the line-shaped irradiation region 30 is also changed, during the movement thereof over the powder layer 25, along the first direction R1 which changes with the location on the irradiation field 11, to be precise depending on the geometry of the portion $T_a$, to be produced, of the layer of the three-dimensional component 21. Producing the line-shaped irradiation region 30 and the movement thereof over the powder layer 25 is realized with the aid of the two scanner mirrors 23a, 23b of the (two-dimensional) scanner device 15 in the shown example. To this end, the rotational drives 23a, 23b of the two scanner mirrors 22a, 22b are suitably actuated with the aid of the control device 16 to suitably position the laser beam 3 in the processing field 11 of the scanner device 15. For the purposes of producing the oscillating movement, the rotational drives 23a, 23b can be actuated at a high frequency to obtain an oscillation frequency of more than approximately 1 kHz, for example.

With the aid of the rotational drives 23a, 23b, the laser beam 3 can be moved in the processing field 11 in such a way, in particular, that the line-shaped irradiation region 30 can be aligned or rotated practically as desired and (twice) the amplitude of the oscillating movement, i.e., the length L of the line-shaped irradiation region 30, can also be varied over a comparatively large value range that, naturally, is restricted by the size of the processing field 11 of the scanner device 15. For actuating the rotational drives 23a, 23b, the control device 16 resorts to data about the (two-dimensional) geometry of the three-dimensional component 21 to be produced at the respectively to be irradiated powder layer 25, which data are stored in a storage device or predetermined by a programming system.

Figure 6B:
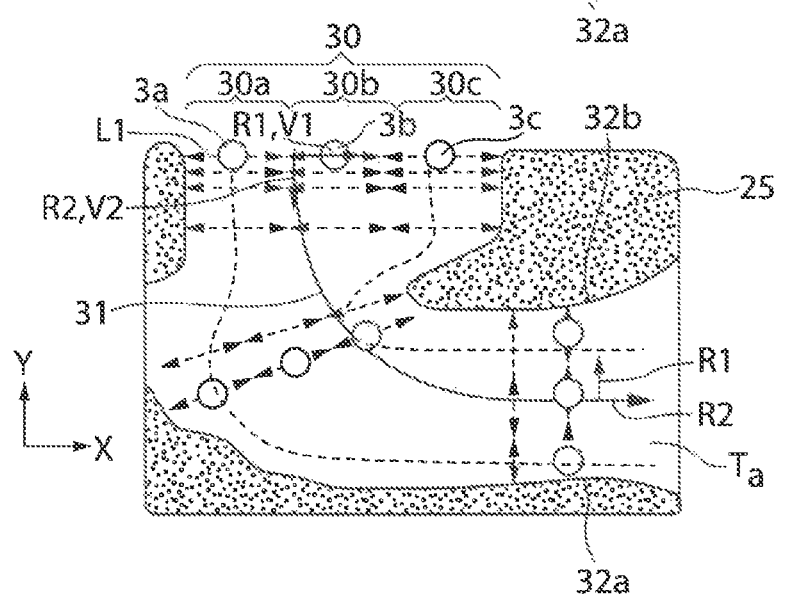

As can likewise be identified in FIGS. 6A and 6B, the two edges 32a,b of the portion $T_a$ to be produced, which arise when moving the two ends of the line-shaped irradiation region 30 along the trajectory 31 shown in FIGS. 6A and 6B, have great smoothness, i.e., they correspond with a high resolution to the intended contour of the edge of the portion $T_a$ to be produced. The high resolution is achieved by changing the alignment and by changing the length L of the line-shaped irradiation region 30 during the movement along the trajectory 31. One or possibly both edges 32a,b of the portion $T_a$ may correspond to a contour of the component 21 to be produced. Particularly in the case of large components 21, one or both edges 32a,b of the portion $T_a$ possibly do not correspond to the contour of the component 21 since a further portion of the component 21 to be produced may adjoin the respective edge 32a,b in a laterally adjacent manner.

Like FIG. 6A, FIG. 6B shows the production of the portion $T_a$ of the layer of the three-dimensional component 21; however, in contrast to FIG. 6A, not one but three laser beams 3a-c are used in the illustration shown in FIG. 6B to produce the line-shaped irradiation region 30. Here, each of the three laser beams 3a-c carries out an oscillating movement, forming a first, second, and third section 30a-c of the line-shaped irradiation region 30. Here, the three sections 30a-c, which form the line-shaped irradiation region 30, immediately adjoin one another and have the same length L1 (corresponding to twice the amplitude of the oscillating movement). The power introduced into the powder layer 25 can be increased by using two or more laser beams 3a-c and the construction rate for producing the three-dimensional component 21 can be increased.

In the shown example, the three laser beams 3a-c are movable independently of one another over the powder layer 25. To facilitate this, the scanner device 15 may have three pairs of scanner mirrors 22a, 22b, which each serve as two-dimensional scanners to move a respective laser beam 3a-c over the powder layer 25. It is understood that two, or more than three, laser beams 3a-c, too, can be moved independently of one another over the powder layer 25 or over the processing field 11 in this way. Optionally, it is also possible to use diffractive, optionally switchable, optical elements to move the two or more laser beams 3a-c independently of one another over the powder layer 25.

If two or more laser beams 3a-c can be moved independently of one another over the powder layer 25, these can be used firstly, as illustrated in FIG. 6B, to produce a line-shaped irradiation region 30 together. Depending on the geometry of the component 21 to be produced or on the geometry of a portion $T_a$, to be produced in each case, of the layer of the component 21 to be produced, corresponding to one of the portions $T_{1a}, \ldots, T_{1d}$ or $T_2$, to be irradiated, of the powder layer 25 (see FIG. 5), the two or more laser beams 3a-c also can be used secondly to irradiate different portions $T_{1a}, \ldots, T_{1d}$ or $T_2$ of the powder layer 25 (see FIG. 5) independently of one another, wherein, for example, the respective laser beam 3a-c does not carry out an oscillating movement when producing a contour line of the component 21 to be produced. Consequently, the use of a plurality of the laser beams 3a-c substantially increases the flexibility when producing different three-dimensional components 21.

Figure 7A:
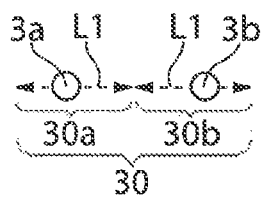
FIGS. 7A-7C are three illustrations of two laser beams, which each carry out an oscillating movement and which together produce a line-shaped irradiation region.
Figure 7B:
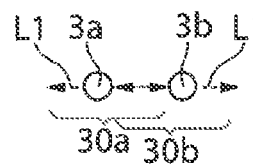
Figure 7C:
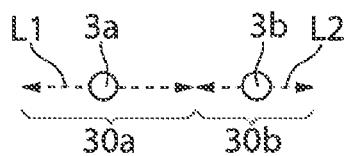

The line-shaped irradiation region 30 shown in FIG. 6B can be produced in different ways with the aid of two or more laser beams 3a, 3b to influence the stability of the melt within the meaning of molten pool calming or influence the homogeneity of the melt, and, optionally, to increase the construction rate by virtue of the length L of the line-shaped irradiation region 30 and of the molten pool being increased. FIG. 7A shows the production of the line-shaped irradiation region 30 using two laser beams 3a, 3b which, analogously to FIG. 6B, produce a respective section 30a, 30b with an identical length L1 by virtue of these carrying out an oscillating movement in each case. FIG. 7B shows a case in which the two portions 30a, 30b partly overlap, to be precise in a region that makes up approximately 10% of the length L1. FIG. 7C shows a case in which the two sections 30a, 30b have a different length L1, L2 to form the line-shaped irradiation region 30 together. It is understood that, if need be, the two sections 30a, 30b may overlap completely (100%), wherein, in principle, any value for the overlap (i.e., between 0% and 100%) is possible.

Figure 8A:
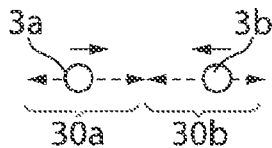
FIGS. 8A and 8B are two illustrations of two laser beams that carry out an oscillating movement in opposite senses or in the same sense.
Figure 8B:
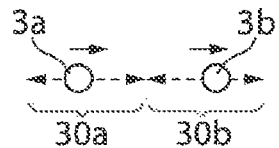

FIGS. 8A and 8B show the case of the line-shaped irradiation region of FIG. 7A, in which the two sections 30a,b do not overlap and have an identical length L1. In FIGS. 8A and 8B, the two sections 30a,b have a constant phase relation, i.e., the oscillating movement of the respective laser beams 3a, 3b is implemented with the same oscillation frequency. FIG. 8A shows the case where the two laser beams 3a, 3b are moved in the opposite sense; FIG. 8B shows the case where the two laser beams 3a, 3b are moved in the same sense. It is understood that other phase relations between the oscillating movements of the two laser beams 3a, 3b are also possible.

Figure 9:
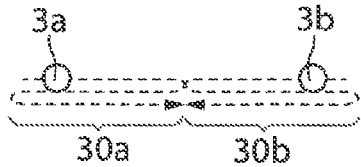
FIG. 9 is an illustration of two laser beams that carry out an oscillating movement with opposite senses of rotation.

Finally, FIG. 9 shows the different sense of rotation of the oscillating movement of the two laser beams 3a, 3b in the case of the movement of FIG. 8A in the opposite sense. It is understood that the laser beams 3a, 3b, as illustrated in FIGS. 8A and 8B, oscillate along a common line in the illustration selected in FIG. 9 and that a meandering movement is only illustrated in FIG. 9 for elucidating the sense of rotation of the oscillating movement. It is likewise understood that there need not necessarily be a fixed phase relation between the oscillating movements of the two laser beams 3a, 3b, but that the oscillation frequencies of the two laser beams 3a, 3b may be selected to be different if need be.

The frequency of the oscillating movement of the at least one laser beam 3, 3a-c, and consequently the velocity v1, averaged over a period, in the first direction R1 (see FIG. 6B), which is used to produce the line-shaped irradiation region 30, is significantly larger than the advance velocity v2, i.e., the velocity in the second direction R2. Typically, the velocity v1 of the oscillating movement is at least ten times as large, preferably at least twenty times as large as the advance velocity v2.

FIG. 10 shows a strip-shaped portion $T_a$ of a layer of a three-dimensional component that is completely melted with the aid of the laser beam 3 of the processing machine 20 of FIG. 5. The strip-shaped portion $T_a$ extending in the Y-direction has a width in the X-direction that corresponds to the length L of the line-shaped irradiation region 30, which is produced by the laser beam 3 during the oscillating movement in the X-direction. In the first direction R1, which corresponds to the X-direction in the shown example, the laser beam 3 is moved with an oscillating movement over the powder layer (not illustrated in FIG. 10), wherein the velocity v1 of the oscillating movement in the first direction R1 is constant, i.e., the velocity v1 in the first direction R1 is independent of the position of the laser beam 3 in the X-direction. In the second direction R2 (advance direction), which corresponds to the Y-direction in the shown example, the laser beam 3 is likewise moved at a constant velocity v2; however, it does not carry out an oscillating movement in the process, and so, overall, the zigzag-shaped trajectory 31 shown in FIG. 10 sets in.

Since each position in the X-direction with the exception of the reversing points 33a,b of the oscillating movement is scanned two times (or more) with the same velocity v1 (more precisely, with the same magnitude of the velocity v1) by the laser beam 3, this results in a substantially more homogeneous energy influx in the first direction R1; i.e., the energy influx is substantially independent of the position of the laser beam 3 in the first direction R1.

Since a finite acceleration occurs at the two reversing points 33a,b of the zigzag-shaped trajectory 31, the laser beam 3 dwells for longer than desired at the reversing points 33a,b, as a result of which there is unwanted increased heating of the powder material at the edge of the portion $T_a$ to be produced. To solve this problem, it was found to be advantageous to reduce the power $P_U$ of the laser beam 3 at the two reversing points 33a,b of the continuous oscillating movement in relation to a power $P_Z$ of the laser beam 3 between the two reversing points 33a,b of the continuous oscillating movement; i.e., the following applies: $P_U < P_Z$. The power $P_u$ at the reversing points 33a,b can be reduced in this case to, for example, less than 40%, less than 30% or less than 20% of the power $P_Z$ between the reversing points 33a,b. The power $P_Z$ of the laser beam 3, which is radiated in between the reversing points 33a,b can be, in particular, a maximum power that can be produced by the beam source 2 of the processing machine 20 of FIG. 5.

In the zigzag-shaped trajectory 31 shown in FIG. 10, too, in which a substantially homogeneous energy influx is achieved in the X-direction, there may be an inhomogeneous energy influx firstly in the Y-direction, to be precise in the case where the laser beam 3 has a beam profile that is comparatively narrow in comparison with the advance per oscillating movement and that drops off quickly to the edges, for example a beam profile in the form of a Gaussian beam profile. In this case, there may be a reduced energy influx particularly in the regions illustrated in FIG. 10 as dashed triangles 34, which are formed at the edges of the line-shaped irradiation region 30 between adjacent reversing points 33a and 33b in the Y-direction, while the energy influx in the center of the portion $T_a$ is substantially more homogeneous. This leads to the powder material being heated further above the melting temperature than is necessary at the reversing points 33a,b, leading to a disturbed production process. This problem can be solved by a higher oscillation frequency of the oscillating movement in the X-direction, which is matched to the advance speed in such a way that each position within the line-shaped irradiation region 30 is scanned at least two times, preferably at least three times, by the laser beam 3. However, the maximum oscillation frequency of the oscillating movement in the X-direction is limited by the maximum oscillation frequency of the scanner mirrors 22a,b.

FIGS. 11A and 11B show an option for solving the problem of the inhomogeneous energy influx in the Y-direction by virtue of a further continuous oscillating movement in the second direction R2 (Y-direction) being superimposed on the continuous oscillating movement in the first direction R1 (X-direction). A superimposition of two oscillating movements can be realized in a particularly simple manner with the aid of the two scanner mirrors 22a,b. It is understood that, in addition to the oscillating movement in the second direction R2 (Y-direction), there is an advance at a constant velocity $v2_C$ in the Y-direction, i.e., the velocity v2 in the second direction R2 has a constant component $v2_C$ and an oscillating component $v2_O$ ($v2=v2_C+v2_O$). The constant component $v2_C$ is required for moving the line-shaped irradiation region 30 over the powder layer in the Y-direction. In the examples shown in FIGS. 11A and 11B, the oscillation frequency $f_1$ of the oscillating movement in the X-direction corresponds to the oscillation frequency $f_2$ of the oscillating movement in the Y-direction, which, in combination with the constant component $v2_C$ of the velocity v2 in the Y-direction, leads to the spiral-shaped trajectories 31 shown in FIGS. 11A and 11B. The amplitude $A_1$ of the oscillating movement in the X-direction corresponds here to half the length L of the line-shaped irradiation region 30 ($L=2 A_1$).

The trajectories 31 shown in FIGS. 11A and 11B differ from one another by the different amplitude $A_2$ of the oscillating movement in the Y-direction and by a respectively different pitch h of the spiral trajectories 31, which in turn is dependent on the constant component $v2_C$ of the velocity v2 in the Y-direction. On account of the same oscillation frequencies $f_1$, $f_2$, the two oscillating movements have a constant phase shift φ, which is at 90° or at π/2 in the shown example. In the case of such a phase shift φ, the oscillating component $v2_O$ of the velocity v2 of the further oscillating movement in the Y-direction is at a maximum in the case of the minimum velocity v1 of the oscillating movement in the X-direction, which is reached at the reversing point 33*a,b*. In this way, there can be a particularly homogeneous energy influx into the powder material in the Y-direction.

It is understood that the distance between adjacent reversing points 33*b* in the Y-direction in the illustration of FIG. 10 and the amplitudes $A_2$ of the oscillating movement in the Y-direction in the illustrations of FIGS. 11A and 11B are illustrated in exaggerated fashion for elucidation purposes. As a rule, the following relation applies to the amplitude $A_1$ of the oscillating movement in the X-direction and the amplitude $A_2$ of the oscillating movement in the Y-direction: $A_2/A_1 > 1:3$ and $A_2/A_1 < 1:10$.

The movement of the laser beam or beams 3, 3*a-c* for producing the three-dimensional component 21 or for producing a respective layer or a portion $T_a$ of a respective layer of the component 21 is controlled by the control device 16. As shown in FIG. 5, the control device 16 may be arranged within the irradiation device 1; however, it is also possible for the latter to be arranged outside of the irradiation device 1 and communicate with the scanner unit 15 and with further components of the irradiation device 1 or of the processing machine 20 via a wireless or wired link.

Other Embodiments

It is to be understood that while the invention has been described in conjunction with the detailed description thereof, the foregoing description is intended to illustrate and not limit the scope of the invention, which is defined by the scope of the appended claims. Other aspects, advantages, and modifications are within the scope of the following claims.

What is claimed is:

1. A method for producing at least one portion of a layer of a three-dimensional component, the method comprising
   irradiating a powder layer with at least one high-energy beam in a processing field;
   moving the at least one high-energy beam in a continuous oscillating movement over the powder layer in a first direction to produce a line-shaped irradiation region in which the powder layer is melted; and
   moving the line-shaped irradiation region over the powder layer in a second direction that differs from the first direction to produce the portion of the layer of the three-dimensional component,
   wherein a first velocity of the at least one high-energy beam in the first direction and a second velocity of the at least one high-energy beam in the second direction over the powder layer are matched to one another such that positions in the powder layer within the line-shaped irradiation region are scanned at least two times by the high-energy beam,
   wherein the continuous oscillating movement in the first direction has superimposed thereon a further continuous oscillating movement in the second direction, and
   wherein the oscillating movement in the first direction is implemented at a first oscillation frequency and wherein the further continuous oscillating movement in the second direction is implemented at a second oscillation frequency that is different from the first oscillation frequency.

2. The method of claim 1, wherein the at least one high-energy beam is moved in the processing field with the aid of two scanner mirrors of a scanner device.

3. The method of claim 1, wherein the at least one high-energy beam is a laser beam, and wherein the three-dimensional component is produced layer-by-layer by selective laser melting or selective laser sintering.

4. The method of claim 1, wherein the at least one powder layer is irradiated by means of the at least one high-energy beam in a processing chamber of a processing machine configured to produce three-dimensional components by irradiating powder layers, wherein the processing chamber has a carrier for applying the powder layers.

5. The method of claim 4, wherein the at least one high-energy beam is a laser beam.

6. The method of claim 1, wherein the at least one high-energy beam comprises at least two high-energy beams, which are moved over the powder layer in the first direction with an oscillating movement to produce the line-shaped irradiation region.

7. The method of claim 1, wherein the first direction, the second direction, or both the first and second directions, are changed when moving the line-shaped irradiation region over the powder layer.

8. The method of claim 1, wherein a length of the line-shaped irradiation region in the first direction changes when moving the at least one high-energy beam over the powder layer.

9. The method of claim 1, wherein a velocity of the high-energy beam during the oscillating movement in the first direction is at least ten times greater than a velocity of the high-energy beam during the movement of the line-shaped irradiation region in the second direction.

10. The method of claim 1, wherein each position within the line-shaped irradiation region is scanned at least two times.

11. The method of claim 1, wherein positions within the line-shaped irradiation region are scanned at least three times.

12. The method of claim 1, wherein the at least one high-energy beam is moved at a constant velocity over the powder layer during the continuous oscillating movement in the first direction.

13. The method of claim 1, wherein a power of the at least one high-energy beam at two reversing points of the continuous oscillating movement is reduced in relation to a power of the at least one high-energy beam between the two reversing points of the continuous oscillating movement.

14. The method of claim 1, wherein the second oscillation frequency is an integer multiple of the first oscillation frequency.

15. The method of claim 14, wherein a phase shift between the oscillating movement in the first direction and the further oscillating movement in the second direction lies at 90°.

16. One or more non-transitory computer-readable media storing instructions that are executable by a processing machine configured to produce three-dimensional components by irradiating powder layers, and upon such execution cause the processing machine to perform operations comprising:
   irradiating at least one powder layer with at least one high-energy beam in a processing field;
   moving the at least one high-energy beam in a continuous oscillating movement over the powder layer in a first direction to produce a line-shaped irradiation region in which the powder layer is melted; and
   moving the line-shaped irradiation region over the powder layer in a second direction that differs from the first direction to produce the portion of the layer of the three-dimensional component, wherein a first velocity of the at least one high-energy beam in the first direction and a second velocity of the at least one high-energy beam in the second direction over the powder layer are matched to one another such that positions in the powder layer within the line-shaped irradiation region are scanned at least two times by the high-energy beam, wherein the continuous oscillating movement in the first direction has superimposed thereon a further continuous oscillating movement in the second direction, and wherein the oscillating movement in the first direction is implemented at a first oscillation frequency and wherein the further continuous oscillating movement in the second direction is implemented at a second oscillation frequency that is different from the first oscillation frequency.

17. A method for producing at least one portion of a layer of a three-dimensional component, the method comprising
irradiating at least one powder layer with at least one high-energy beam in a processing field;
moving the at least one high-energy beam in a continuous oscillating movement over the powder layer in a first direction to produce a line-shaped irradiation region in which the powder layer is melted; and
moving the line-shaped irradiation region over the powder layer in a second direction that differs from the first direction to produce the portion of the layer of the three-dimensional component, wherein a further continuous oscillating movement in the second direction is superimposed on the continuous oscillating movement in the first direction has superimposed, wherein the oscillating movement in the first direction is implemented at a first oscillation frequency, wherein the further continuous oscillating movement in the second direction is implemented at a second oscillation frequency, and wherein the second oscillation frequency is an integer multiple of the first oscillation frequency.

18. The method of claim 17, wherein a phase shift between the oscillating movement in the first direction and the further oscillating movement in the second direction lies at 90°.

* * * * *